US012659440B2

(12) United States Patent   (10) Patent No.: US 12,659,440 B2
Nam et al.   (45) Date of Patent: Jun. 16, 2026

(54) IMAGE DISPLAY APPARATUS

(71) Applicant: LG ELECTRONICS INC., Seoul (KR)

(72) Inventors: Yeonoh Nam, Seoul (KR); Kyuri Kim, Seoul (KR); Yejin Hong, Seoul (KR)

(73) Assignee: LG ELECTRONICS INC., Seoul (KR)

( * ) Notice:   Subject to any disclaimer, the term of this patent is extended or adjusted under 35 U.S.C. 154(b) by 178 days.

(21) Appl. No.: 18/527,031

(22) Filed:   Dec. 1, 2023

(65)   Prior Publication Data

US 2024/0348760 A1   Oct. 17, 2024

(30)   Foreign Application Priority Data

Apr. 17, 2023   (KR) ......................... 10-2023-0050064

(51) Int. Cl.
 *G06T 7/90*   (2017.01)
 *G06T 5/90*   (2024.01)
 *G06T 11/00*   (2026.01)
 (Continued)

(52) U.S. Cl.
 CPC ................ *H04N 9/73* (2013.01); *G06T 5/90* (2024.01); *G06T 7/90* (2017.01); *G06V 10/56* (2022.01); *G06T 2207/10024* (2013.01)

(58) Field of Classification Search
 CPC ........ G06T 11/001; G06T 11/20; G06T 11/60; G06T 7/90; G06T 5/90; G06T 2207/10024; G06V 10/56; H04N 1/60; H04N 1/6058; H04N 5/445; H04N 5/57–58; H04N 9/64–9/78; H04N 21/42203–21/4854; G09G 5/02; G09G 5/10; G09G 3/2096; G09G 3/2003; G09G 2320/08; G09G 2320/028; G09G 2320/0271;
(Continued)

(56)   References Cited

U.S. PATENT DOCUMENTS 9,852,531 B2 * 12/2017 Min ......................... G06T 11/40
11,930,226 B2 * 3/2024 Jethwa ............... H04N 21/8549
(Continued)

FOREIGN PATENT DOCUMENTS

JP   H1166309 A * 3/1999 ............... G06T 7/00
KR   1020090058425   6/2009
(Continued)

OTHER PUBLICATIONS

Korean Intellectual Property Office Application No. 10-2023-0050064, Office Action dated Apr. 22, 2024, 7 pages.
1 European Patent Office Application Serial No. 23214941.9, Search Report dated May 3, 2024, 10 pages.
(Continued)

*Primary Examiner* — Wesner Sajous
(74) *Attorney, Agent, or Firm* — LEE, HONG, DEGERMAN, KANG & WAIMEY

(57)   ABSTRACT

The present disclosure relates to an image display apparatus. The image display apparatus according to an embodiment of the present disclosure includes: a display; an interface configured to exchange data with an external server or an external electronic device; and a signal processing device configured to extract emotion-based color scale information from an image frame of an input image, and to adjust white balance of the image frame based on the extracted information. Accordingly, the image frame may be displayed with an emotion-based image quality.

18 Claims, 23 Drawing Sheets

(51) Int. Cl.

| | |
|---|---|
| *G06V 10/56* | (2022.01) |
| *G09G 5/02* | (2006.01) |
| *H04N 1/60* | (2006.01) |
| *H04N 5/57* | (2006.01) |
| *H04N 9/64* | (2023.01) |
| *H04N 9/69* | (2023.01) |
| *H04N 9/73* | (2023.01) |

(58) Field of Classification Search

CPC ..... G09G 2320/0276; G09G 2320/066; G09G 2320/0666; G09G 2370/12; G09G 2310/08; G09G 2340/06; G09G 2360/16; G06F 3/005; G06F 3/0482–04845; G06F 3/147; G06F 3/167

See application file for complete search history.

(56) References Cited

U.S. PATENT DOCUMENTS

| | | | | |
|---|---|---|---|---|
| 2006/0164442 A1* | 7/2006 | Furuhata | ................ | G09G 5/003 |
| | | | | 348/E5.074 |
| 2011/0164050 A1* | 7/2011 | Adachi | ................ | G09G 3/3406 |
| | | | | 345/589 |
| 2017/0011210 A1* | 1/2017 | Cheong | ................. | A61B 5/681 |

FOREIGN PATENT DOCUMENTS

| | | | | |
|---|---|---|---|---|
| KR | 1020100038829 | 4/2010 | | |
| KR | 1020130056746 | 5/2013 | | |
| WO | WO-2020204472 A1 * | 10/2020 | ............. | G06F 3/005 |

* cited by examiner (a)                    (b)                    (c)

FIG. 10B

| Emotion | Feature | W/B | Color/Contrast |
|---|---|---|---|
| Casual | Soft, Warm | Warm | Low |
| Romantic | Soft, Medium | Medium | Low |
| Clear | Soft, Cool | Cool | Low |
| Dynamic | Hard, Warm | Warm | Low |
| Elegant | Medium, Medium | Medium | Medium |
| Modern | Hard, Cool | Cool | High |
| Classic | Hard, Medium | Warm | High |

(a)    (c)    (e)

(b)    (d)    (f)

(a)

(b)

(c)

(d)

(e)

(f)

(a)    (c)    (e)

(b)    (d)    (f)

IMAGE DISPLAY APPARATUS

CROSS-REFERENCE TO RELATED APPLICATION(S)

Pursuant to 35 U.S.C. § 119, this application claims the benefit of earlier filing date and right of priority to Korean Application No(s). 10-2023-0050064, filed on Apr. 17, 2023, the contents of which are all incorporated by reference herein in its entirety.

BACKGROUND OF THE DISCLOSURE

1. Field of the Disclosure

This disclosure relates to an image display apparatus, and more particularly to an image display apparatus capable of displaying image frames with an emotion-based image quality.

2. Description of the Related Art

An image display apparatus is an apparatus capable of displaying various images.

As users watch various contents on the image display apparatus, the image display apparatus provides a function to adjust brightness/contrast and the like based on content type such as a sports mode, movie mode, etc.

However, the function of adjusting brightness/contrast based on the content type, such as a sports mode, movie mode, etc., has a drawback in that brightness is adjusted to the same level, such that adaptive image quality processing may not be performed on image frames. Furthermore, there is also a drawback in that image quality may not be adjusted based on emotions of image frames.

SUMMARY

It is an objective of the present disclosure to provide an image display apparatus capable of displaying image frames with an emotion-based image quality.

Meanwhile, it is another objective of the present disclosure to provide an image display apparatus capable of extracting emotion of content based on background colors of image frames, and performing image quality processing based on the extracted emotion.

Meanwhile, it is further another objective of the present disclosure to provide an image display apparatus capable of increasing the sense of immersion in content based on background colors of image frames.

In order to achieve the above and other objectives, an image display apparatus according to an embodiment of the present disclosure includes: a display; an interface configured to exchange data with an external server or an external electronic device; and a signal processing device configured to extract emotion-based color scale information from an image frame of an input image, and to adjust white balance of the image frame based on the extracted information.

Meanwhile, the signal processing device may be configured to: in response to emotion-based color scale information of an input image in a first image frame being first information, adjust white balance of the first image frame to a first ratio; and in response to emotion-based color scale information of an input image in a second image frame being second information, adjust white balance of the second image frame to a second ratio.

Meanwhile, based on the extracted information, the signal processing device may further adjust contrast or color of the image frame.

Meanwhile, the signal processing device may be configured to: in response to the emotion-based color scale information of the input image in the first image frame being the first information, adjust contrast of the first image frame to a first level; and in response to the emotion-based color scale information of the input image in the second image frame being the second information, adjust contrast of the second image frame to a second level.

Meanwhile, the signal processing device may be configured to: in response to the emotion-based color scale information of the input image in the first image frame being the first information, adjust color of the first image frame to a first color; and in response to the emotion-based color scale information of the input image in the second image frame being the second information, adjust color of the second image frame to a second color.

Meanwhile, the signal processing device may receive, from the server or the electronic device, parameter data for extracting the emotion-based color scale information and may extract the emotion-based color scale information by performing processing based on the parameter data.

Meanwhile, the signal processing device may generate, by learning, parameter data for extracting the emotion-based color scale information, and may extract the emotion-based color scale information by performing processing based on the parameter data.

Meanwhile, the signal processing device may extract coordinate information in the emotion-based color scale information from the image frame and may adjust the white balance of the image frame based on the extracted coordinate information.

Meanwhile, the signal processing device may extract coordinate information, corresponding to a dominant color of the image frame, in the emotion-based color scale information.

Meanwhile, the signal processing device may be configured to: as the coordinate information in the emotion-based color scale information moves in a first direction on a first axis, adjust white balance for increasing a red region of the image frame; and as the coordinate information in the emotion-based color scale information moves in a second direction which is opposite to the first direction on the first axis, adjust white balance for increasing a blue region of the image frame.

Meanwhile, the signal processing device may be configured to: as the coordinate information in the emotion-based color scale information moves in a third direction on a second axis, decrease a contrast level of the image frame; and as the coordinate information in the emotion-based color scale information moves in a fourth direction which is opposite to the third direction on the second axis, increase the contrast level of the image frame.

Meanwhile, the signal processing device may divide the emotion-based color scale information into a first region (Casual), a second region (Dynamic), a third region (Romantic), a fourth region (Elegant), a fifth region (Classic), a sixth region (Clear), and a seventh region (Modern) on a two-dimensional basis, wherein the signal processing device may control white balance of the third to fifth regions to be higher than that of the first and second regions, and may control white balance of the sixth and seventh regions to be higher than that of the third to fifth regions.

Meanwhile, the signal processing device may control contrast of the second region to increase more than that of the first region, may control contrast of the third to fifth regions to increase in order of the third region, the fourth region, and the fifth region, and may control contrast of the seventh region to increase more than that of the sixth region.

Meanwhile, the signal processing device may set a first pattern in the first image frame as first color coordinates, wherein in response to receiving the first image frame having the first pattern, the signal processing device may set the first pattern as the first color coordinates, and in response to receiving a second image frame having a second pattern identical to the first pattern, the signal processing device may set the second pattern as second color coordinates different from the first color coordinates.

Meanwhile, the display may include: a panel; and a timing controller configured to output a data driving signal and a gate driving signal based on an image signal from the signal processing device, wherein the timing controller may output the data driving signal and the gate driving signal based on an image signal for which the white balance of the image frame is adjusted.

The image display apparatus according to an embodiment of the present disclosure may further include an input interface configured to receive a command signal from a remote controller, wherein the signal processing device may adjust the white balance of the image frame based on a white balance setting value set on a white balance setting screen, and the extracted information.

An image display apparatus according to another embodiment of the present disclosure includes: a display; an interface configured to exchange data with an external server or an external electronic device; and a signal processing device configured to extract emotion-based color scale information from an image frame of an input image, and to adjust contrast of the image frame based on the extracted information.

An image display apparatus according to further another embodiment of the present disclosure includes: a display; an interface configured to exchange data with an external server or an external electronic device; and a signal processing device configured to, in response to receiving a first image frame having a first pattern, set the first pattern as first color coordinates, and in response to receiving a second image frame having a second pattern identical to the first pattern, set the second pattern as second color coordinates different from the first color coordinates.

Meanwhile, the signal processing device may extract emotion-based color scale information from an image frame of an input image and may adjust white balance of the image frame based on the extracted information.

Meanwhile, the signal processing device may adjust contrast of the image frame based on the extracted information.

DETAILED DESCRIPTION OF THE PREFERRED EMBODIMENTS

Hereinafter, the present disclosure will be described in further detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
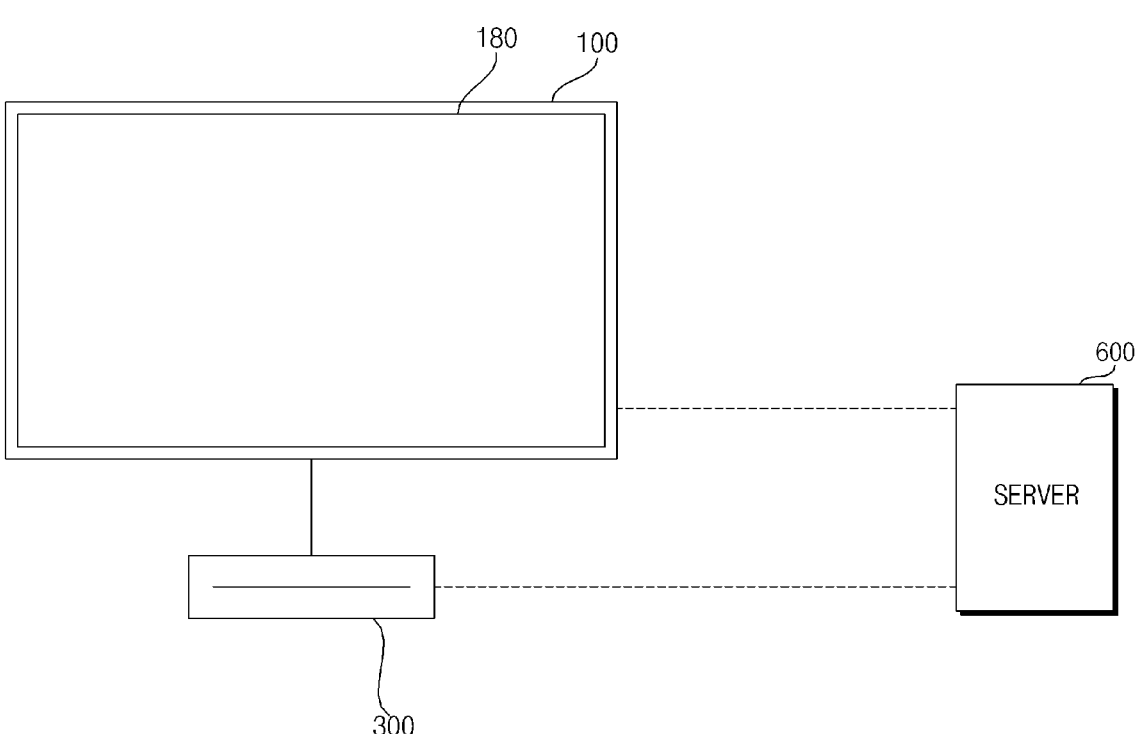
FIG. 1 is a diagram illustrating an image display system according to an embodiment of the present disclosure.

FIG. 1 is a diagram illustrating an image display system according to an embodiment of the present disclosure.

Referring to the drawing, the image display system 10 according to an embodiment of the present disclosure may comprise an image display apparatus 100 including a display 180, a set-top box 300, and a server 600.

The image display apparatus 100 according to an embodiment of the present disclosure may receive images from the set-top box 300 or the server 600.

For example, the image display apparatus 100 may receive an image signal from the set-top box 300 through an HDMI terminal.

Figure 2:
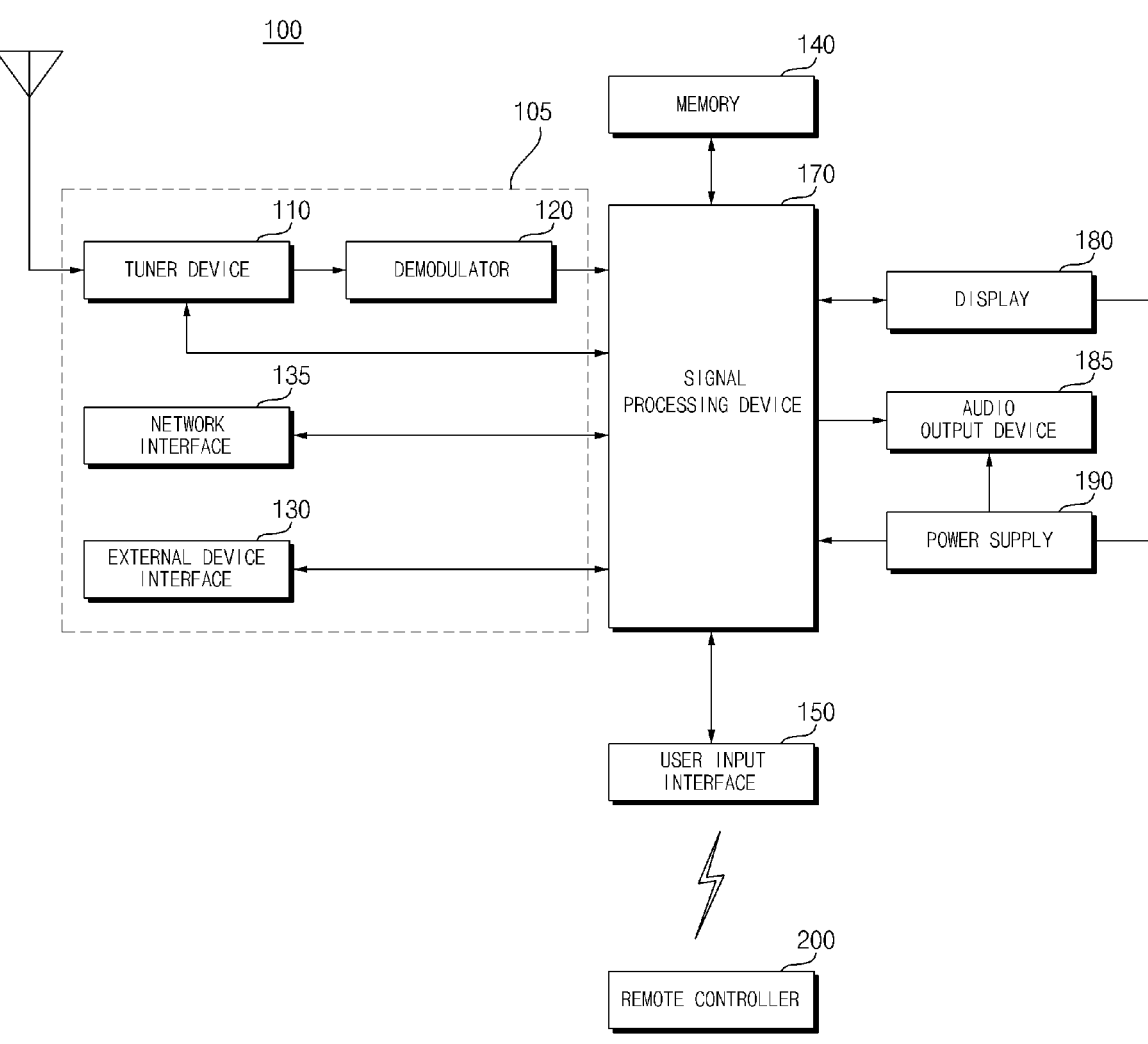
FIG. 2 is an example of an internal block diagram of an image display apparatus of FIG. 1.

In another example, the image display apparatus 100 may receive an image signal from the server 600 through a network terminal or a network interface 135 (see FIG. 2).

Meanwhile, the image display apparatus 100 according to an embodiment of the present disclosure may include a display 180, an interface 135 configured to exchange data with the external server 600 or an external electronic device (not shown), and a signal processing device 170 (see FIG. 2) configured to extract emotion-based color scale information from an image frame of an input image and to adjust white balance of the image frame based on the extracted information.

Accordingly, the image frame may be displayed with an emotion-based image quality. Particularly, emotion in content may be extracted based on a background color of the image frame, and picture or image quality processing may be performed based on the extracted emotion, thereby increasing the sense of immersion in content based on the background color of the image frame.

Meanwhile, the display 180 may be implemented with any one of various panels. For example, the display 180 may be any one of a liquid crystal display (LCD) panel, an organic light emitting diode (OLED) panel, an inorganic light emitting diode (LED) panel, and the like.

Meanwhile, the image display apparatus 100 shown in FIG. 1 may be a TV, a monitor, a tablet PC, a mobile device, etc.

FIG. 2 is a block diagram of the image display apparatus shown in FIG. 1.

Referring to FIG. 2, the image display apparatus 100 according to an embodiment of the present disclosure may comprise an image receiver 105, an external device interface 130, a memory 140, a user input interface 150, a sensor device (not shown) (see FIG. 12), a signal processing device 170, the display 180, and an audio output device 185.

The image receiver 105 may comprise a tuner device 110, a demodulator 120, a network interface 135, and an external device interface 130.

Unlike FIG. 2, the image receiver 105 may comprise only the tuner device 110, the demodulator 120, and the external device interface 130. That is, the image receiver 105 may not include the network interface 135.

The tuner device 110 selects a Radio Frequency (RF) broadcast signal corresponding to a channel selected by a user or an RF broadcast signal corresponding to each of pre-stored channels from among a plurality of RF broadcast signals received through an antenna (not shown). In addition, the tuner device 110 downconverts the selected RF broadcast signal into an Intermediate Frequency (IF) signal or a baseband Audio/Video (A/V) signal.

For example, if the selected RF broadcast signal is a digital broadcast signal, the tuner device 110 downconverts the selected RF broadcast signal into a digital IF signal. On the other hand, if the selected RF broadcast signal is an analog broadcast signal, the tuner device 110 downconverts the selected RF broadcast signal into an analog baseband A/V signal (CVBS/SIF). That is, the tuner device 110 may process a digital broadcast signal or an analog broadcast signal. The analog baseband A/V signal, CVBS/SIF from the tuner device 110 may be provided directly to the signal processing device 170.

Meanwhile, the tuner device 110 may comprise a plurality of tuners for receiving broadcast signals of a plurality of channels, or a single tuner for simultaneously receiving broadcast signals of a plurality of channels.

The demodulator 120 receives the digital IF signal from the tuner device 110 and demodulates the digital IF signal.

The demodulator 120 may perform demodulation and channel decoding on the digital IF signal, thereby obtaining a stream signal TS. The stream signal TS may be a signal in which an image signal, an audio signal and/or a data signal are multiplexed.

The stream signal output from the demodulator 120 may be input to the signal processing device 170 and then subjected to demultiplexing and A/V signal processing. The signal processing device 170 outputs the processed video and audio signals to the display 180 and the audio output device 185, respectively.

The external device interface 130 may transmit and receive data to and from a connected external device (not shown) such as a set-top box. For this purpose, the external device interface 130 may comprise an A/V Input/Output (I/O) device (not shown).

The external device interface 130 may be connected to an external device, wirelessly or by wire, such as a Digital Versatile Disk (DVD) player, a Blu-ray Disk (BD) player, a game console, a camera, a camcorder, a computer (e.g. a laptop computer), or a set-top box. Then, the external device interface 130 may transmit and receive signals to and from the external device.

The A/V input and output device may receive audio and image signals from an external device, and a wireless communicator (not shown) may conduct short-range wireless communication with another electronic device.

The external device interface 130 may exchange data with a nearby mobile terminal 600 through the wireless communicator (not shown). Particularly, the external device interface 130 may receive device information, executed application information, an application image, and so on from the mobile terminal 600 in a mirroring mode.

The network interface 135 serves as an interface between the image display apparatus 100 and a wired/wireless network such as the Internet. For example, the network interface 135 may receive content or data from the Internet or from a Content Provider (CP) or a Network Provider (NP) over a network.

Meanwhile, the network interface 135 may comprise a wireless communicator (not shown).

The memory 140 may store programs necessary for the signal processing device 170 to process signals and control, and may also store a signal-processed image, audio, or data signal.

In addition, the memory 140 may also temporarily store an audio, video or data signal received from the external device interface 130. The memory 140 may store information about broadcast channels by the channel-add function.

While the memory 140 is shown in FIG. 2 as configured separately from the signal processing device 170, to which the present disclosure is not limited, the memory 140 may be incorporated into the signal processing device 170.

The user input interface 150 transmits a signal received from the user to the signal processing device 170 or transmits a signal received from the signal processing device 170 to the user.

For example, the user input interface 150 may transmit/ receive user input signals, such as a power-on/off signal, a channel selection signal, a screen setting signal, etc., to/from a remote controller 200, may provide the signal processing device 170 with user input signals received from local keys (not shown), such as inputs of a power key, a channel key, a volume key, and a setting value, transmit a user input signal received from the sensor device (not shown) (see FIG. 12) that senses a user gesture to the signal processing device 170, or transmit a signal received from the signal processing device 170 to the sensor device (not shown) (see FIG. 12).

The signal processing device 170 may demultiplex a stream signal received from the tuner device 110, the demodulator 120, the network interface 135, or the external device interface 130 into a number of signals, and process the demultiplexed signals into audio and image signals.

For example, the signal processing device 170 may receive a broadcast signal or an HDMI signal received by the image receiver 105, and output a processed image signal by processing the received broadcast signal or the received HDMI signal.

The image signal processed by the signal processing device 170 may be displayed as an image corresponding to the image signal on the display 180. The image signal processed by the signal processing device 170 may also be transmitted to an external output device through the external device interface 130.

The audio signal processed by the signal processing device 170 may be output to the audio output device 185. Also, the audio signal processed by the signal processing device 170 may be transmitted to an external output device through the external device interface 130.

While not shown in FIG. 2, the signal processing device 170 may comprise a Demultiplexer (DEMUX) and a video processor, which will be described later with reference to FIG. 3. That is, the signal processing device 170 may process various types of signals and accordingly may be implemented in the form of a system On Chip (SOC). It will be described in more detail with reference to FIG. 3.

In addition, the signal processing device 170 may provide overall control to the image display apparatus 100. For example, the signal processing device 170 may control the tuner device 110 to select an RF broadcast signal corresponding to a user-selected channel or a pre-stored channel.

The signal processing device 170 may control the image display apparatus 100 according to a user command received through the user input interface 150 or according to an internal program.

The signal processing device 170 may control the display 180 to display an image. The image displayed on the display 180 may be a Two-Dimensional (2D) or Three-Dimensional (3D) still image or video.

The signal processing device 170 may control a particular 2D object in the image displayed on the display 180. For example, the particular 2D object may be at least one of a linked Web page (e.g. from a newspaper or a magazine), an Electronic Program Guide (EPG), a menu, a widget, an icon, a still image, a video, or text.

The signal processing device 170 may locate the user based on an image captured by a camera device (not shown). For example, the signal processing device 170 may determine the distance (a z-axis coordinate) between the user and the image display apparatus 100. In addition, the signal processing device 170 may determine x-axis and y-axis coordinates corresponding to the position of the user on the display 180.

The display 180 generates drive signals by converting a processed image signal, a processed data signal, an On Screen Display (OSD) signal, and a control signal received from the signal processing device 170 or an image signal, a data signal, and a control signal received from the external device interface 130.

Meanwhile, the display 180 may also be a touch screen that can be used not only as an output device but also as an input device.

The audio output device 185 may receive a processed audio signal from the signal processing device 170 and output the received audio signal as voice.

The camera device (not shown) captures a user. The camera device may comprise, but not limited to, a single camera. When needed, the camera device may comprise a plurality of cameras. Image information captured by the camera device may be provided to the signal processing device 170.

The signal processing device 170 may sense a user's gesture from a captured image received from the camera device (not shown) or from signals received from the sensor device (not shown) (see FIG. 12) alone or in combination.

A power supply 190 supplies power across the whole image display apparatus 100. Particularly, the power supply 190 may supply power to the signal processing device 170 which may be implemented as a System On Chip (SOC), the display 180 for displaying an image, the audio output device 185 for outputting an audio signal, and so on.

Specifically, the power supply 190 may comprise a converter for converting Alternating Current (AC) power to Direct Current (DC) power, and a DC/DC converter for converting the level of DC power.

The remote controller 200 transmits a user input to the user input interface 150. For the transmission of a user input, the remote controller 200 may operate based on various communication standards such as Bluetooth, RF communication, IR communication, Ultra WideBand (UWB), and ZigBee. In addition, the remote controller 200 may receive an image signal, an audio signal and/or a data signal from the user input interface 150 and may output the received signal as an image or sound.

The above-described image display apparatus 100 may be a fixed or mobile digital broadcast receiver.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
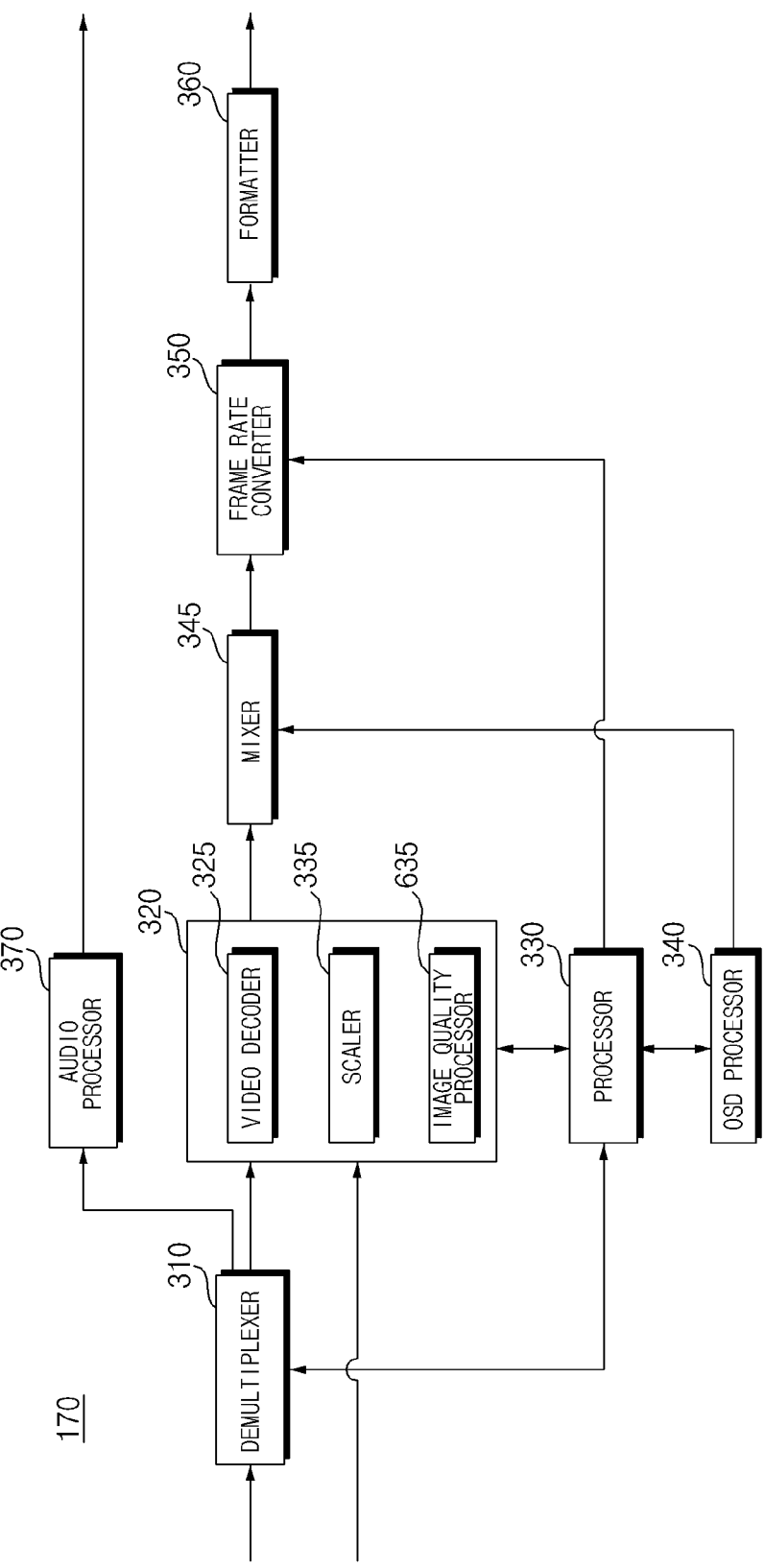
FIG. 3 is an example of an internal block diagram of a signal processing device of FIG. 2.

FIG. 3 is a block diagram of the signal processing device illustrated in FIG. 2.

Referring to FIG. 3, the signal processing device 170 may comprise a DEMUX 310, an image processor 320, a processor 330, and an audio processor 370. The signal processing device 170 may further comprise a data processor (not shown).

The DEMUX 310 demultiplexes an input stream. For example, the DEMUX 310 may demultiplex an MPEG-2 TS into an image signal, an audio signal, and a data signal. The input stream signal may be received from the tuner device 110, the demodulator 120, or the external device interface 130.

The image processor 320 may perform signal processing based on a received image. For example, the image processor 320 may perform image processing based on an image signal demultiplexed by the DEMUX 310.

To this end, the image processor 320 may comprise a video decoder 325, a scaler 335, an image quality processor 635, a video encoder (not shown), an OSD processor 340, a Fame Rate Converter (FRC) 350, a formatter 360, etc.

The video decoder 325 decodes the demultiplexed image signal, and the scaler 335 scales resolution of the decoded image signal so that the image signal may be displayed on the display 180.

The video decoder 325 may be provided with decoders that operate in conformance to various standards. For example, the video decoder 325 may comprise, for example, an MPEG-2 decoder, an H.264 decoder, a 3D video decoder for a color image, a depth image, a decoder for multi-view images, and so on.

The scaler 335 may scale a received image signal which is decoded by the video decoder 325.

For example, when the size or resolution of a received image signal is small and low, the scaler 335 may upscale the received image signal. When the size or resolution of a received image signal is great and high, the scaler 335 may downscale the received image signal.

The image quality processor 635 may perform image quality processing based on a received image signal which is decoded by the video decoder 325.

For example, the image quality processor 635 may reduce noise of a received image signal, extend resolution of grayscale of the received image signal, enhance image resolution, perform High Dynamic Range (HDR)-based signal processing, change a frame rate, or perform image quality processing to corresponding to characteristics of a panel.

The OSD processor 340 generates an OSD signal autonomously or according to a user input. For example, the OSD processor 340 may generate signals by which a variety of information is displayed as graphics or text on the display 180, according to user input signals. The OSD signal may comprise various data such as a User Interface (UI), a variety of menus, widgets, and icons. The generated OSD signal may comprise a 2D or 3D object.

Further, the OSD processor 340 may generate a pointer to be displayed on the display 180 based on a pointing signal received from the remote controller 200. Especially, the pointer may be generated from a pointing signal processing device (not shown), which may reside in the OSD processor 340. Obviously, the pointing signal processing device may be configured separately from the OSD processor 240.

The FRC 350 may change the frame rate of the received image signal or simply output the image signal without frame rate conversion.

The formatter 360 may change the format of a received image signal to an image signal to be displayed on the display.

Particularly, the formatter 360 may change the format of a received image signal to correspond to characteristics of a display panel.

Meanwhile, the formatter 360 may change the format of an image signal. For example, the formatter 360 may change the format of a 3D image signal to one of various 3D formats such as a side by side format, a top/down format, a frame sequential format, an interlaced format, and a checker format.

The processor 330 may control overall operations in the image display apparatus 100 or the signal processing device 170.

For example, the processor 330 may control the tuner device 110 to tune to an RF broadcast signal corresponding to a user-selected channel or a pre-stored channel.

The processor 330 may control the image display apparatus 100 according to a user command received through the user input interface 150 or according to an internal program.

In addition, the processor 330 may control data transmission through the network interface 135 or the external device interface 130.

In addition, the processor 330 may control operations of the DEMUX 310 and the image processor 320 in the signal processing device 170.

The audio processor 370 of the signal processing device 170 may process the demultiplexed audio signal. For the audio signal processing, the audio processor 370 may have a plurality of decoders.

The audio processor 370 of the signal processing device 170 may also adjust the bass, treble, and volume of the audio signal.

The data processor (not shown) of the signal processing device 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

Meanwhile, the block diagram of the signal processing device 170 illustrated in FIG. 3 is purely exemplary. Depending upon the specifications of the signal processing device 170 in actual implementation, the components of the signal processing device 170 may be combined or omitted or new components may be added.

In particular, the FRC 350 and the formatter 360 may be provided separately from the image processor 320.

Figure 4A:
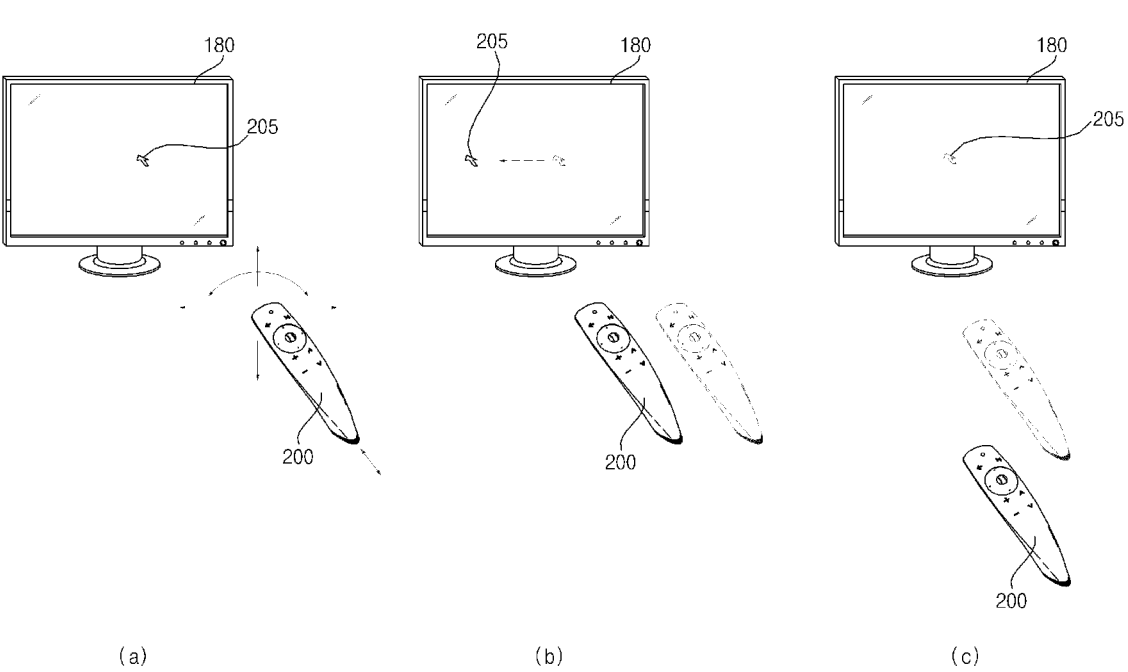
FIG. 4A is a diagram illustrating a method for controlling a remote controller illustrated in FIG. 2.

FIG. 4A is a diagram illustrating a method for controlling the remote controller illustrated in FIG. 2. [0118] (a) of FIG. 4A illustrates a pointer 205 representing movement of the remote controller 200, displayed on the display 180.

The user may move or rotate the remote controller 200 up and down, side to side ((b) of FIG. 4A), and back and forth ((c) of FIG. 4A). The pointer 205 displayed on the display

180 corresponds to movement of the remote controller 200. Since the pointer 205 moves in accordance with the movement of the remote controller 200 in a 3D space, the remote controller 200 may be referred to as a remote controller 200 or a 3D pointing device.

Referring to (b) of FIG. 4A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may calculate coordinates of the pointer 205 based on the motion information of the remote controller 200. The image display apparatus then displays the pointer 205 at the calculated coordinates.

Referring to (c) of FIG. 4A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4B:
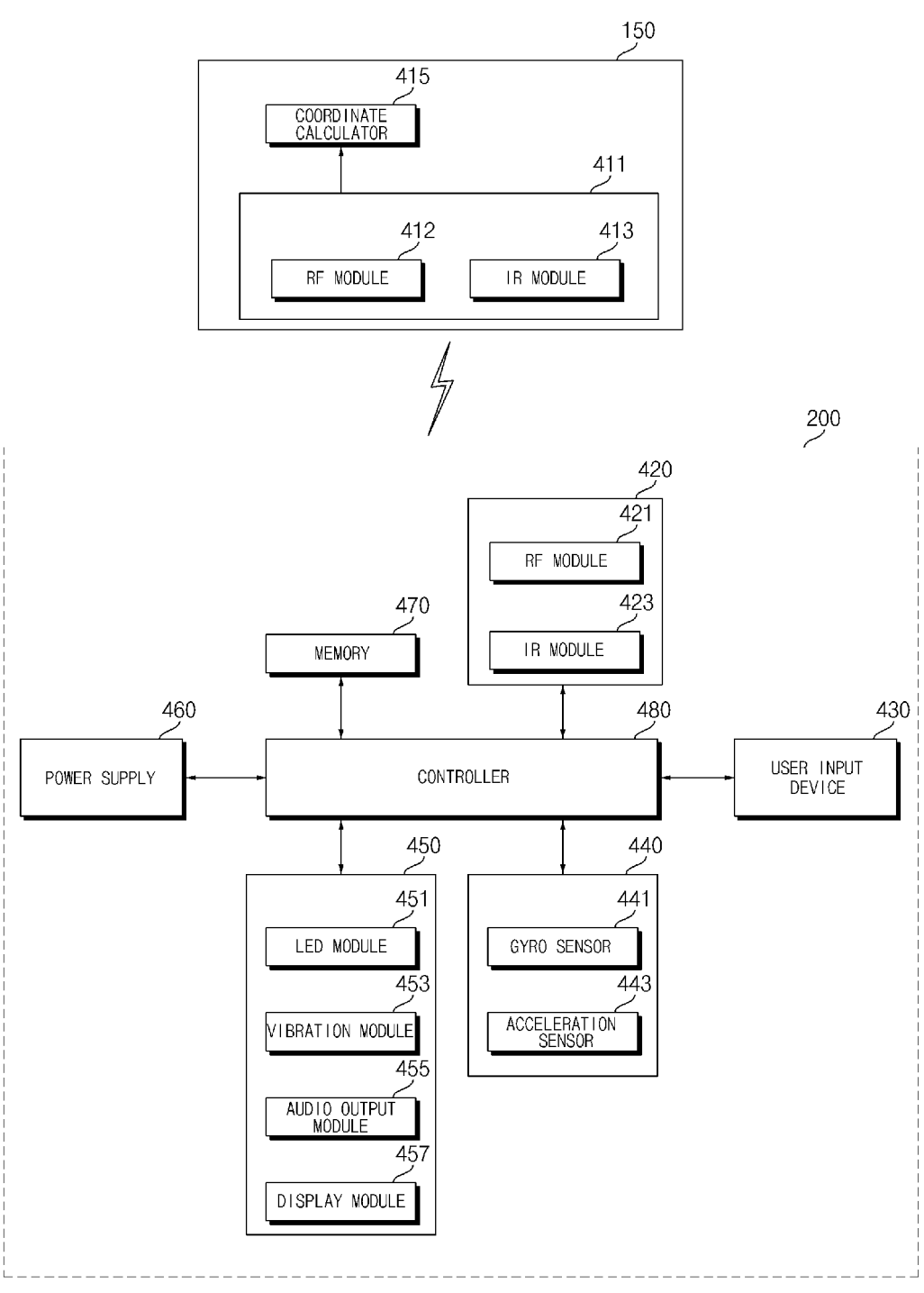
FIG. 4B is an internal block diagram of the remote controller illustrated in FIG. 2.

FIG. 4B is a block diagram of the remote controller illustrated in FIG. 2.

Referring to FIG. 4B, the remote controller 200 may comprise a wireless communicator 425, a user input device 435, a sensor device 440, an output device 450, a power supply 460, a memory 470, and a controller 480.

The wireless communicator 425 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the remote controller 200 may comprise an RF module 421 for transmitting RF signals to and/or receiving RF signals from the image display apparatus 100 according to an RF communication standard. Further, the remote controller 200 may comprise an IR module 423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 421.

Further, the remote controller 200 may receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input device 435 may comprise a keypad, a plurality of buttons, a touch pad, or a touch screen. The user may enter commands to the image display apparatus 100 by manipulating the user input device 435. If the user input device 435 includes a plurality of hard-key buttons, the user may input various commands to the image display apparatus 100 by pressing the hard-key buttons. If the user input device 435 includes a touch screen displaying a plurality of soft keys, the user may input various commands to the image display apparatus 100 by touching the soft keys. The user input device 435 may also include various input tools other than those set forth herein, such as a scroll key and/or a jog key, which should not be construed as limiting the present disclosure.

The sensor device 440 may comprise a gyro sensor 441 and/or an acceleration sensor 443. The gyro sensor 441 may sense the movement of the remote controller 200.

For example, the gyro sensor 441 may sense motion information about the remote controller 200 in X-, Y-, and Z-axis directions. The acceleration sensor 443 may sense the moving speed of the remote controller 200. The sensor device 440 may further comprise a distance sensor for sensing the distance between the remote controller 200 and the display 180.

The output device 450 may output a video and/or audio signal corresponding to a manipulation of the user input device 435 or a signal transmitted by the image display apparatus 100. The user may easily identify whether the user input device 435 has been manipulated or whether the image display apparatus 100 has been controlled based on the video and/or audio signal output from the output device 450.

For example, the output device 450 may comprise an LED module 451 which is turned on or off whenever the user input device 435 is manipulated or whenever a signal is received from or transmitted to the image display apparatus 100 through the wireless communicator 425, a vibration module 453 which generates vibrations, an audio output module 455 which outputs audio data, or a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The controller 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The controller 480 provides overall control to the remote controller 200. For example, the controller 480 may transmit a signal corresponding to a key manipulation detected from the user input device 435 or a signal corresponding to motion of the remote controller 200, as sensed by the sensor device 440, to the image display apparatus 100 through the wireless communicator 425.

The user input interface 150 of the image display apparatus 100 may comprise a wireless communication module 411 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 412. In addition, the user input interface 150 may wirelessly receive IR signals from the remote controller 200 through an IR module 413 according to the IR communication standard.

The coordinate calculator 415 may receive motion information regarding the movement of the remote controller 200 through the wireless communication module 411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the signal processing device 170. Then, the signal processing device 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the signal processing device 170.

In a further example, unlike the configuration of the remote controller 200 illustrated in FIG. 17B, the coordinate calculator 415 may reside in the signal processing device 170, instead of the user input interface 150.

Figure 5:
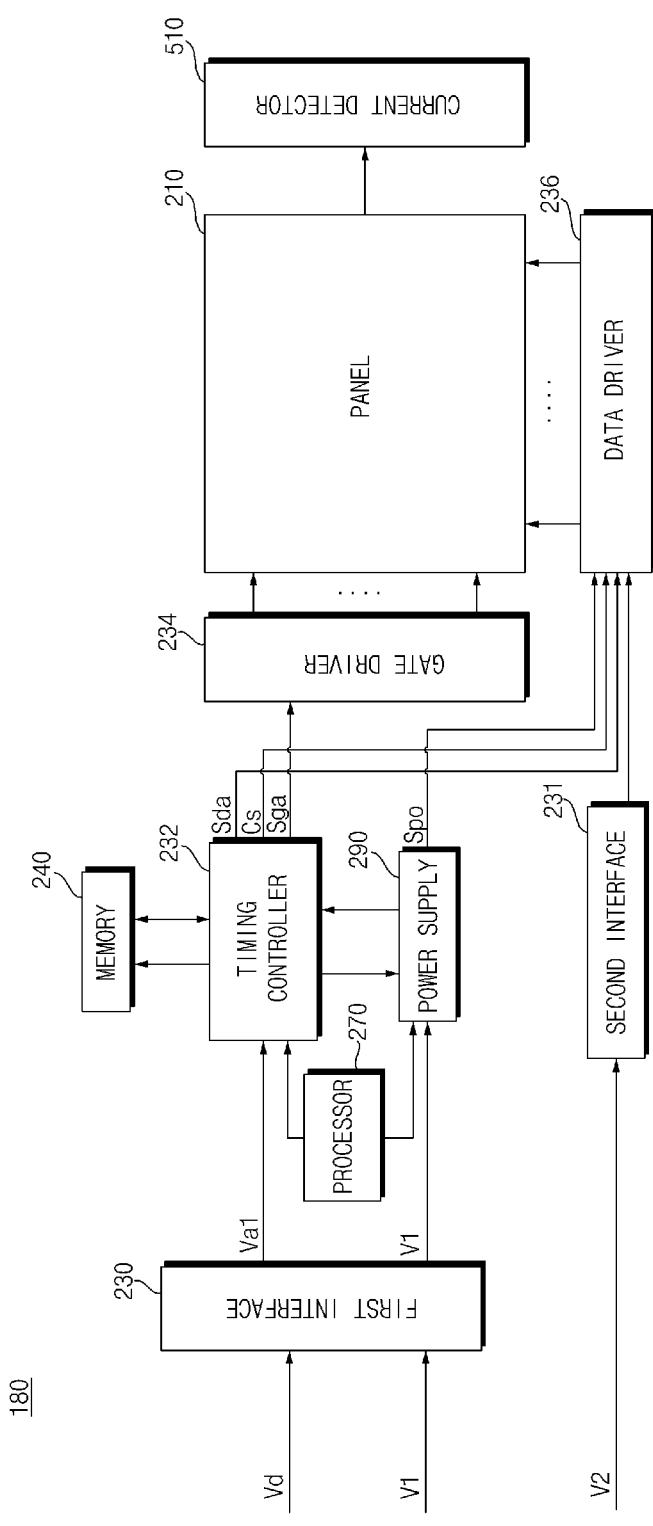
FIG. 5 is an internal block diagram of a display of FIG. 2.

FIG. 5 is a block diagram of the display shown in FIG. 2.

Referring to the drawing, the display 180 may comprise a display panel 210, a first interface 230, a second interface 231, a timing controller 232, a gate driver 234, a data driver 236, a memory 240, a processor 270, a power supply 290, a current detector 510, etc.

The display 180 may receive an image signal Vd, a first DC power V1, and a second DC power V2, and display a specific image based on an image signal Vd.

Meanwhile, the first interface 230 of the display 180 may receive the image signal Vd and the first DC power V1 from the signal processing device 170.

Here, the first DC power V1 may be used to operate the power supply 290 and the timing controller 230 in the display 180.

The second interface 231 may receive the second DC power V2 from an external power supply 190. Meanwhile, the second DC power V2 may be input to the data driver 236 in the display 180.

The timing controller 232 may output a data driving signal Sda and a gate driving signal Sga based on the image signal Vd.

For example, when the first interface 230 outputs a converted image signal val by converting the received image signal Vd, the timing controller 232 may output the data driving signal Sda and the gate driving signal Sga based on the converted image signal val.

The timing controller 232 may further receive a control signal and a vertical synchronization signal in addition to the image signal vd from the signal processing device 170.

In addition, the timing controller 232 may output a gate driving signal Sga for operating the gate driver 234 and a data driving signal Sda for operating the data driver 236, based on the control signal and the vertical synchronization signal Vsync in addition to the image signal Vd.

In the case where the panel 210 includes RGBW subpixels, the data driving signal Sda may be a data driving signal for operating the RGBW subpixels.

Meanwhile, in the case where the panel 210 includes RGB subpixels, the data driving signal Sda may be a data driving signal for operating the RGB subpixels.

Meanwhile, the timing controller 232 may further output a control signal Cs to the gate driver 234.

In accordance with the gate driving signal Sga and the data driving signal Sda from the timing controller 232, the gate driver 234 and the data driver 236 supply a scan signal and an image signal through gate lines GL and data lines DL, respectively. Accordingly, the panel 210 displays the specific image.

Meanwhile, the panel 210 may comprise a light emitting layer, and a plurality of gate lines GL and a plurality of data lines DL may cross each other in a matrix form at each pixel corresponding to the light emitting layer.

Meanwhile, the data driver 236 may output a data signal to the panel 210 based on the second DC power V2 from the second interface 231.

The power supply 290 may supply various types of power to the gate driver 234, the data driver 236, the timing controller 232, etc.

The current detector 510 may detect a current flowing in a subpixel of the panel 210. The detected current may be input to the processor 270 or the like to calculate accumulated currents.

The processor 270 may perform various control operations in the display 180. For example, the processor 270 may control the gate driver 234, the data driver 236, the timing controller 232, etc.

Meanwhile, the processor 270 may receive information on a current flowing in a subpixel of the panel 210 from the current detector 510.

In addition, the processor 270 may calculate accumulated currents in a subpixel of the panel 210 based on the information on a current flowing in the subpixel of the panel 210. The calculated value of the accumulated currents may be stored in the memory 240.

Meanwhile, when accumulated currents in a subpixel of the panel 210 is greater than a threshold level, the processor 270 may determine that the subpixel burns-in.

For example, when accumulated currents in a subpixel of the panel 210 are equal to or greater than 300000 A, the processor 270 may determine that the subpixel burns-in.

Meanwhile, when accumulated currents in some of subpixels of the panel 210 are close to a threshold level, the processor 270 may determine that the corresponding subpixels are burn-in expected subpixels.

Meanwhile, based on a current detected by the current detector 510, the processor 270 may determine that a subpixel having the greatest accumulated currents is a burn-in expected subpixel.

Figure 6:
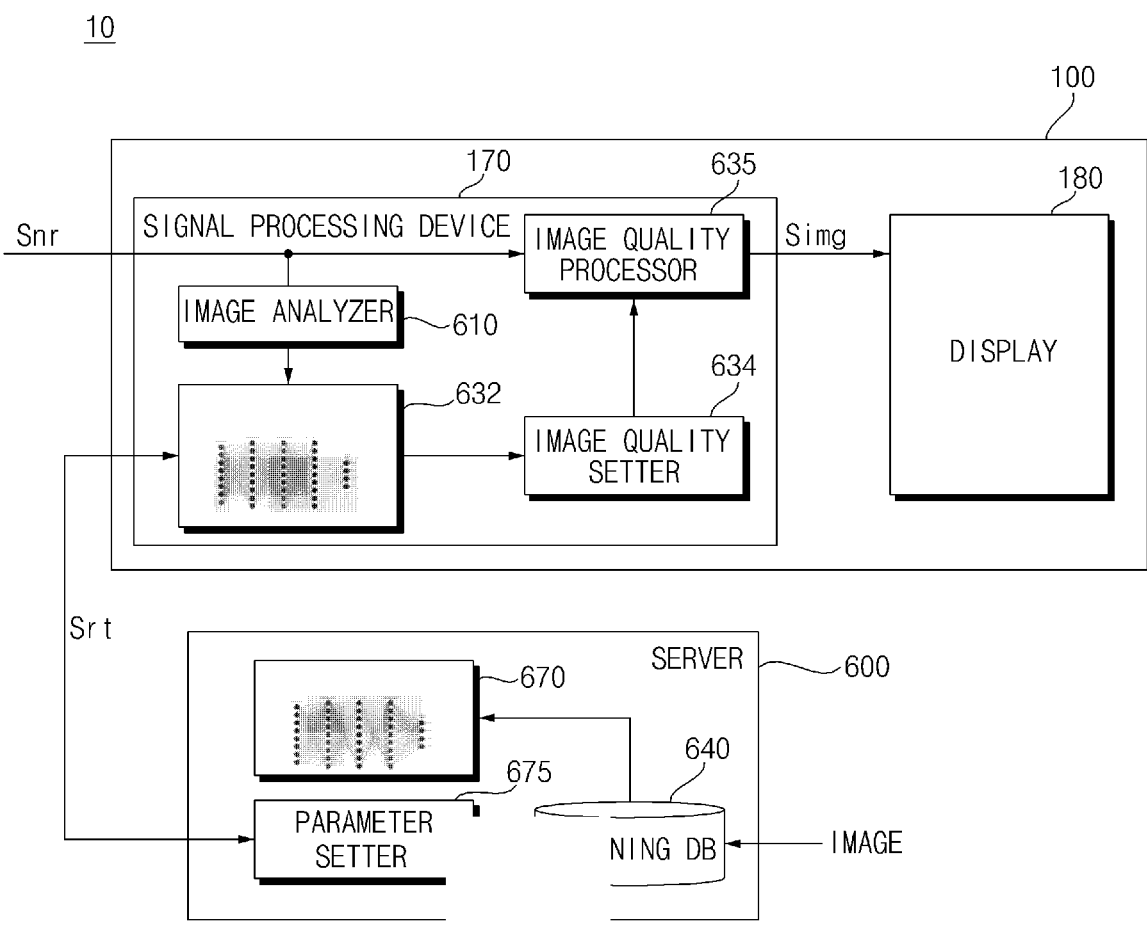
FIG. 6 is an example of an internal block diagram illustrating an image display apparatus according to an embodiment of the present disclosure.

FIG. 6 is an example of an internal block diagram illustrating an image display apparatus according to an embodiment of the present disclosure.

Referring to the drawing, an image display apparatus 100 according to an embodiment of the present disclosure may exchange data with the server 600.

The server 600 may include: a training database 640 for receiving and storing images; a training processor 670 configured to perform training for extracting emotion-based color scale information by using a Deep Neural Network and images from the training database 640; and a parameter setter 675 configured to set parameter data for extracting the emotion-based color scale information.

The parameter setter 675 may transmit parameters for extracting the emotion-based color scale information to a color coordinate matcher 632 in the image display apparatus 100.

The image display apparatus 100 may include: an image receiver 105 configured to receive an image signal from an external set-top box 300 or a network; a signal processing device 170 configured to perform signal processing on the image signal received by the image receiver 105; and a display 180 configured to display the image processed by the signal processing device 170.

Meanwhile, the signal processing device 170 may extract emotion-based color scale information from an image frame of an input image, and adjusts white balance of the image frame based on the extracted information.

To this end, the signal processing device 170 may receive, from the server 600 or an electronic device (not shown), parameter data for extracting the emotion-based color scale information and may extract the emotion-based color scale information by performing processing based on the parameter data.

Meanwhile, the signal processing device 170 may extract coordinate information, corresponding to a dominant color of the image frame, in the emotion-based color scale information.

Meanwhile, the signal processing device 170 may generate, by learning, parameter data for extracting the emotion-based color scale information, and may extract the emotion-based color scale information by performing processing based on the parameter data.

Meanwhile, the signal processing device 170 may include an image analyzer 610, the color coordinate matcher 632 configured to extract emotion-based color scale information based on information from the image analyzer 610, an image quality setter 634 configured to set an image quality based on the emotion-based color scale information from the color coordinate matcher 632, and an image quality processor 635 configured to perform image quality processing according to the set image quality.

Meanwhile, the image analyzer 610 may analyze an input image signal Snr and output information related to the analyzed input image signal.

Particularly, the image analyzer 610 may analyze a background color and the like of the input image and may output background color information of an image frame.

The color coordinate matcher 632 may receive parameter data Srt for extracting the emotion-based color scale information from the parameter setter 675 in the server 600, and may extract the emotion-based color scale information by performing processing based on the parameter data.

For example, the color coordinate matcher 632 may extract the emotion-based color scale information based on the received parameter data and the background color information from the image analyzer 610, and by performing processing using a deep learning algorithm and the like.

In this case, the deep learning algorithm involves an inference process of applying a result of training based on received parameters.

The coordinate information in the emotion-based color scale information may be one-dimensional coordinate information for adjusting white balance of an image frame.

For example, if the coordinate information in the emotion-based color scale information is one-dimensional coordinate information, colors get warmer toward the left and get cooler toward the right.

Meanwhile, the coordinate information in the emotion-based color scale information may be two-dimensional coordinate information for adjusting white balance of an image frame and the like.

For example, if the coordinate information in the emotion-based color scale information is two-dimensional coordinate information, colors get warmer toward the left, get cooler toward the right, get softer toward the top, and get harder toward the bottom.

The image quality setter 634 may perform setting for adjusting white balance of an image frame based on the coordinate information in the emotion-based color scale information of the image frame.

Meanwhile, if emotion-based color scale information of an input image in a first image frame is first information, the image quality setter 634 may set white balance of the first image frame to a first ratio, and if emotion-based color scale information of an input image in a second image frame is second information, the image quality setter 634 may set white balance of the second image frame to a second ratio.

For example, if the emotion-based color scale information of the input image in the first image frame is the first information, the image quality setter 634 may set R/G/B white balance to a ratio of 120/255, 130/255, 125/255.

In another example, if the emotion-based color scale information of the input image in the second image frame is the second information, the image quality setter 634 may set R/G/B white balance to a ratio of 125/255, 125/255, 130/255.

The image quality processor 635 may perform image quality processing based on the image quality set by the image quality setter 634.

The image quality processor 635 may adjust white balance of the image frames based on the coordinate information in the emotion-based color scale information of the image frames.

Meanwhile, if the emotion-based color scale information of the input image in the first image frame is the first information, the image quality processor 635 may adjust white balance of the first image frame to the first ratio, and if the emotion-based color scale information of the input image in the second image frame is the second information, the image quality processor 635 may adjust white balance of the second image frame to the second ratio. Accordingly, the image frames may be displayed with an emotion-based image quality.

For example, if the emotion-based color scale information of the input image in the first image frame is the first information, the image quality processor 635 may adjust the R/G/B white balance of the first image frame to a ratio of 120/255, 130/255, 125/255.

In another example, if the emotion-based color scale information of the input image in the second image frame is the second information, the image quality processor 635 may adjust the R/G/B white balance of the second image frame to a ratio of 125/255, 125/255, 130/255.

Meanwhile, an image signal processed by the image quality processor 635 may be transmitted to the display 180 having the panel 210 and to the timing controller 232 in the display 180.

The timing controller 232 may output a data driving signal and a gate driving signal based on the image signal Simg for which the white balance of the image frame is adjusted. Accordingly, the image frame may be displayed with an emotion-based image quality.

Meanwhile, the signal processing device 170 may further adjust contrast or color of the image frame based on the extracted information.

For example, if the emotion-based color scale information of the input image in the first image frame is the first information, the image quality processor 635 in the signal processing device 170 may adjust contrast of the first image frame to a first level, and if the emotion-based color scale information of the input image in the second image frame is the second information, the image quality processor 635 in the signal processing device 170 may adjust contrast of the second image frame to a second level.

In another example, if the emotion-based color scale information of the input image in the first image frame is the first information, the image quality processor 635 in the signal processing device 170 may adjust color of the first image frame to a first color, and if the emotion-based color scale information of the input image in the second image frame is the second information, the image quality processor 635 in the signal processing device 170 may adjust color of the second image frame to a second color.

Meanwhile, the signal processing device 170 in the image display apparatus 100 according to another embodiment of the present disclosure extracts emotion-based color scale information from an image frame of an input image, and adjusts contrast of the image frame based on the extracted information. Accordingly, the image frame may be displayed with an emotion-based image quality. Particularly, the signal processing device 170 in the image display apparatus 100 extracts emotion in content based on a background color of the image frame and performs image quality processing based on the extracted emotion, thereby increasing the sense of immersion in content based on the background color of the image frame.

Meanwhile, the signal processing device 170 in the image display apparatus 100 according to further another embodiment of the present disclosure extracts emotion-based color scale information from an image frame of an input image, and adjusts color of the image frame based on the extracted information. Accordingly, the image frame may be displayed with an emotion-based image quality. Particularly, the signal processing device 170 in the image display apparatus 100 extracts emotion in content based on a background color of the image frame and performs image quality processing based on the extracted emotion, thereby increasing the sense of immersion in content based on the background color of the image frame.

While FIG. 6 illustrates an example in which the color coordinate matcher 632 performs an inference process and the server 600 performs a training process, the present disclosure is not limited thereto and various modifications may be made thereto.

For example, the color coordinate matcher 632 may perform both a training process for obtaining a synapse weight in a pre-defined network structure by using several training data, and an inference process of applying a result thereof.

That is, the color coordinate matcher 632 may perform training for extracting emotion-based color scale information, may set parameter data for extracting the emotion-based color scale information based on a result of the training, and may extract the emotion-based color scale information based on the set parameter.

Alternatively, the color coordinate matcher 632 may perform training for extracting emotion-based color scale information, and may extract the emotion-based color scale information based on a result of the training.

Figure 7:
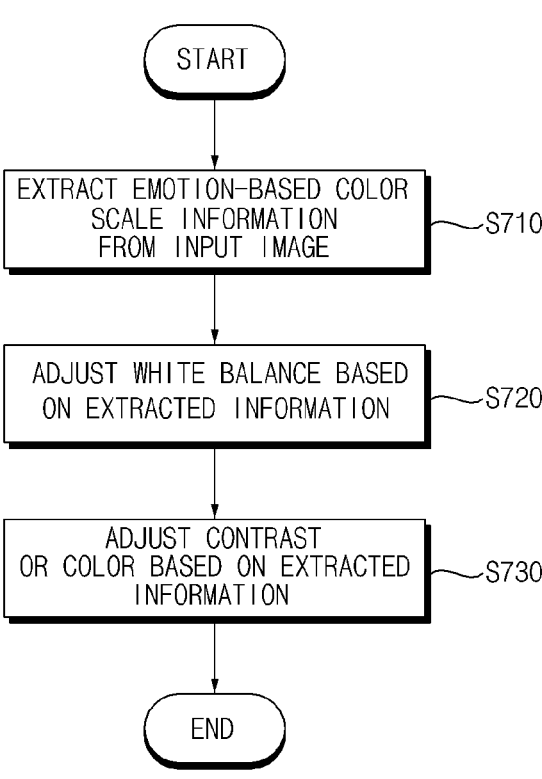
FIG. 7 is a flowchart illustrating an operating method of an image display apparatus according to an embodiment of the present disclosure.

FIG. 7 is a flowchart illustrating an operating method of an image display apparatus according to an embodiment of the present disclosure.

Referring to the drawing, the signal processing device 170 in the image display apparatus 100 extracts emotion-based color scale information from an image frame of an input image (S710).

For example, the signal processing device 170 may analyze a background color of the input image received from an external set-top box 300 or a network, and may extract coordinate information in the emotion-based color scale information based on the background color.

Particularly, the color coordinate matcher 632 in the signal processing device 170 may receive parameter data Srt for extracting the emotion-based color scale information, and may extract the emotion-based color scale information by performing processing based on the parameter data.

Then, the signal processing device 170 may adjust white balance of the image frame based on the extracted information (S720).

The image quality processor 635 in the signal processing device 170 may adjust white balance of the image frame based on the coordinate information in the emotion-based color scale information of the image frame.

For example, if the emotion-based color scale information of the input image in the first image frame is the first information, the image quality processor 635 in the signal processing device 170 may adjust color of the first image frame to the first color, and if the emotion-based color scale information of the input image in the second image frame is the second information, the image quality processor 635 may adjust color of the second image frame to the second color. Accordingly, the image frames may be displayed with an emotion-based image quality.

Subsequently, the signal processing device 170 may adjust contrast of the image frame based on the extracted information (S730).

After adjusting the white balance of the image frame, the image quality processor 635 in the signal processing device 170 may adjust contrast of the image frame based on the coordinate information in the emotion-based color scale information of the image frame.

For example, if the emotion-based color scale information of the input image in the first image frame is the first information, the image quality processor 635 in the signal processing device 170 may adjust contrast of the first image frame to a first level, and if the emotion-based color scale information of the input image in the second image frame is the second information, the image quality processor 635 in the signal processing device 170 may adjust contrast of the second image frame to a second level. Accordingly, the image frames may be displayed with an emotion-based image quality.

Meanwhile, the image quality processor 635 in the signal processing device 170 may further adjust color of the image frame based on the coordinate information in the emotion-based color scale information of the image frame.

For example, if the emotion-based color scale information of the input image in the first image frame is the first information, the image quality processor 635 in the signal processing device 170 may adjust color of the first image frame to the first color, and if the emotion-based color scale information of the input image in the second image frame is the second information, the image quality processor 635 in the signal processing device 170 may adjust color of the second image frame to the second color. Accordingly, the image frames may be displayed with an emotion-based image quality.

FIGS. 8A to 16 are diagrams referred to in the description of FIGS. 6 and 7.

Figure 8A:
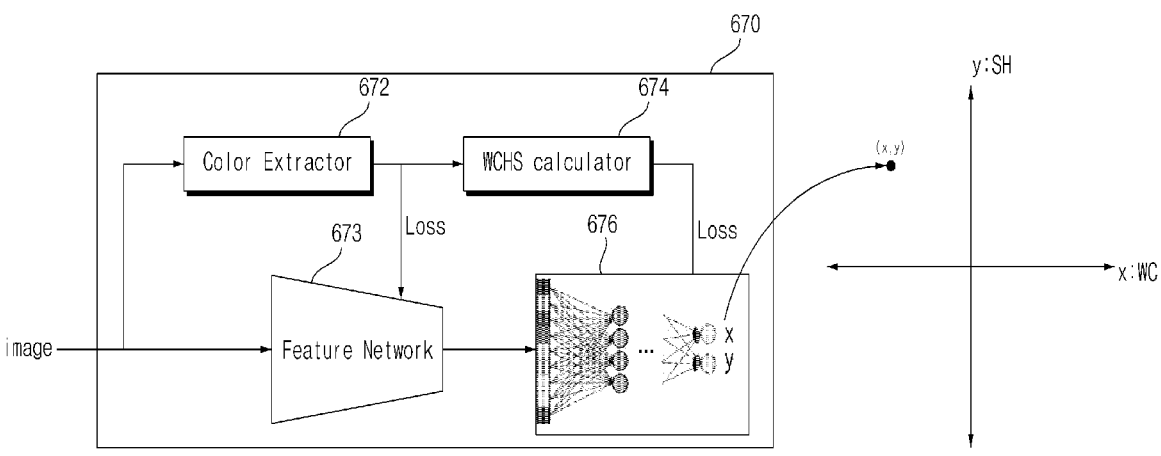
FIGS. 8A to 16 are diagrams referred to in the description of FIGS. 6 and 7.

First, FIG. 8A is an example of an internal block diagram of a training processor 670 in the server 600 of FIG. 6.

Referring to the drawing, the training processor 670 in the server 600 may include a color extractor 672 configured to extract color information of an input image, a color scale calculator 674 configured to calculate color scale information based on the color information, a feature extractor 673 configured to extract feature information of the input image, and a training performer 676 configured to perform training based on the color information, color scale information, or feature information of the input image.

In this case, the color scale information is two-dimensional coordinate information in which colors get warmer toward the left, get cooler toward the right, get softer toward the top, and get harder toward the bottom.

That is, in the color scale information, the x-axis represents warm and cool colors, and the y-axis represents soft and hard colors.

Meanwhile, parameter data for extracting emotion-based color scale information may be set based on a result of training by the training processor 670 in the server 600.

Figure 8B:
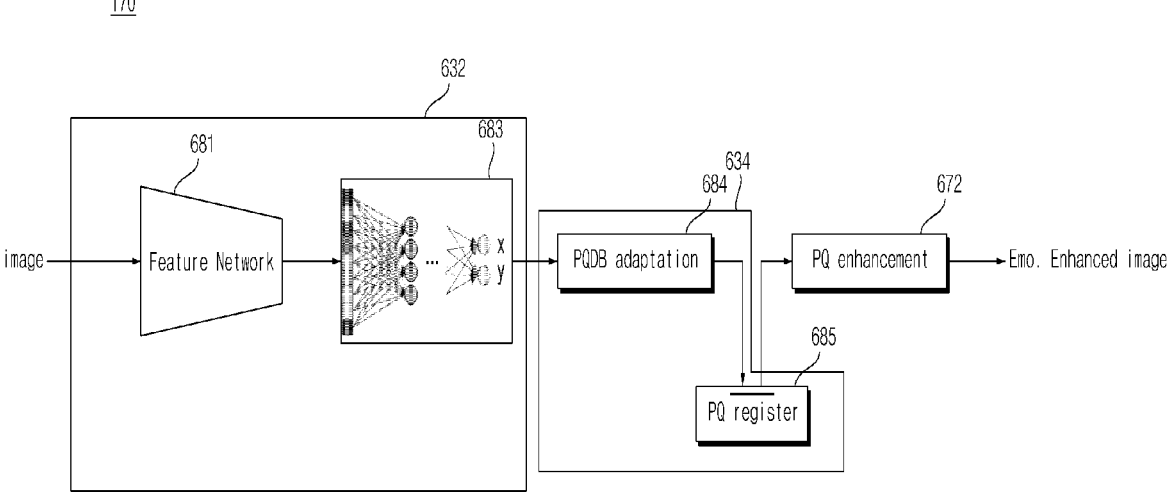

Next, FIG. 8B is an example of an internal block diagram of the color coordinate matcher 632 of the signal processing device 170 in the image display apparatus 100 of FIG. 6.

Referring to the drawing, the color coordinate matcher 632 in the signal processing device 170 may include a feature extractor 673 configured to extract feature information of an input image, and an inference performer 683 configured to perform an inference process based on the feature information of the input image and received parameters and to output emotion-based color scale information.

The emotion-based color scale information output by the color coordinate matcher 632 may be input to the image quality setter 634.

The image quality setter 634 may include an adaptive picture quality setter 684 for an adaptive picture quality based on the emotion-based color scale information, and a register 685 for storing the adaptive picture quality.

Meanwhile, the image quality setter 634 sets a picture or image quality based on the emotion-based color scale information, and an image quality processor 635 performs image quality processing based on an image quality value set by the image quality setter 634.

The image quality processor 635 may adjust white balance of the image frame based on the emotion-based color scale information.

Meanwhile, the image quality processor 635 may further adjust contrast or color of the image frame based on the emotion-based color scale information.

Figure 8C:
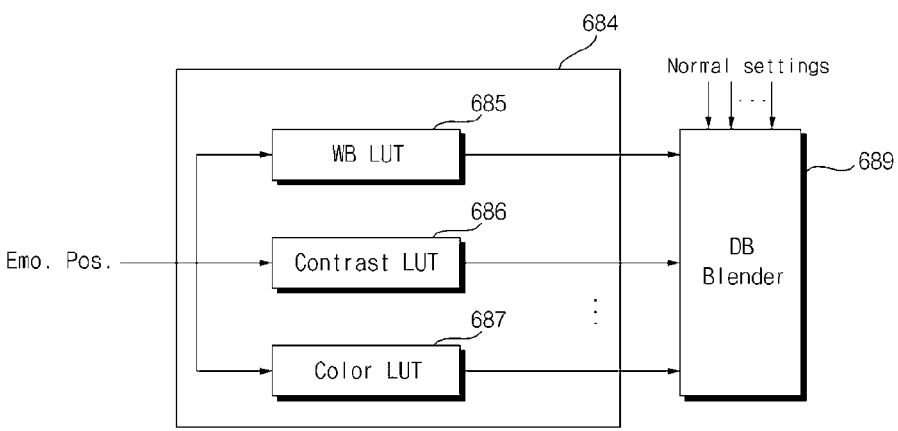

FIG. 8C is an example of an internal block diagram of the adaptive picture quality setter of FIG. 8B.

Referring to the drawing, the adaptive picture quality setter 684 may include a white balance setter 685 for setting white balance based on the emotion-based color scale information, a contrast setter 686 for setting contrast, and a color setter 687 for setting color.

Meanwhile, the white balance setter 685, the contrast setter 686, and the color setter 687 may be respectively implemented by a lookup table, but are not limited thereto and various modifications may be made thereto.

Meanwhile, the image quality setter 634 of FIG. 8B may further include a blender 689 for blending various image quality settings as illustrated herein, in addition to the adaptive picture quality setter 684 and the register 685.

The blender 689 may blend settings of each of the white balance setter 685, the contrast setter 686, and the color setter 687.

Meanwhile, the image quality settings blended by the blender 689 may be input to the image quality processor 635.

Figure 8D:
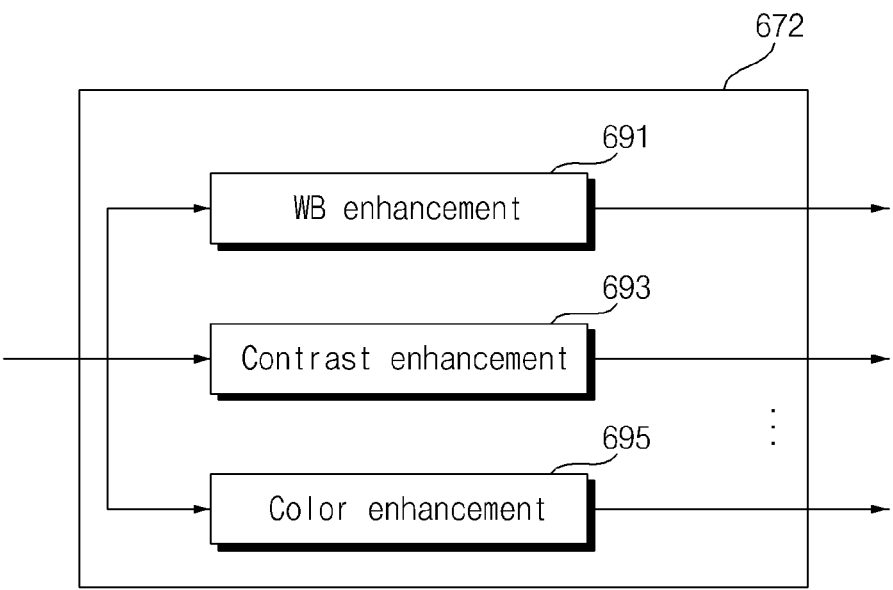

FIG. 8D is an example of an internal block diagram of the image quality processor of FIG. 8B.

Referring to the drawing, the image quality processor 635 may include a white balance adjuster 691 for adjusting white balance according to an image quality set based on the emotion-based color scale information, a contrast adjuster 693 for adjusting contrast, and a color adjuster 695 for adjusting color.

Accordingly, the image quality processor 635 may adjust the white balance, contrast, or color, and the like based on the emotion-based color scale information.

Figure 9A:
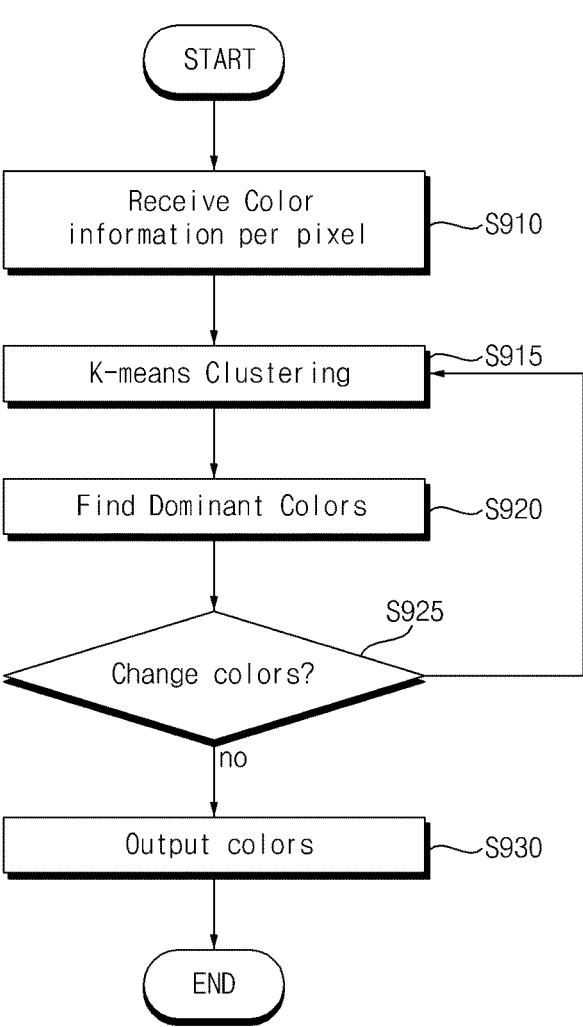

FIG. 9A is a flowchart illustrating operation of the color extractor of FIG. 8A.

Referring to the drawing, the color extractor 672 receives color information per pixel of an input image frame (S910).

Then, the color extractor 672 performs clustering based on the received color information (S915). In this case, the clustering may be K-means Clustering.

Subsequently, the color extractor 672 extracts dominant colors based on the clustered color information (S920).

For example, the color extractor 672 may extract three dominant colors based on the clustered color information.

In another example, the color extractor 672 may extract one dominant color based on the clustered color information.

Next, the color extractor 672 may determine whether colors of the input image frame are changed, and performs operation 915 (S915) again.

Meanwhile, if the colors of the input image frame are not changed, the color extractor 672 outputs the extracted dominant color information (S930).

Figure 9B:
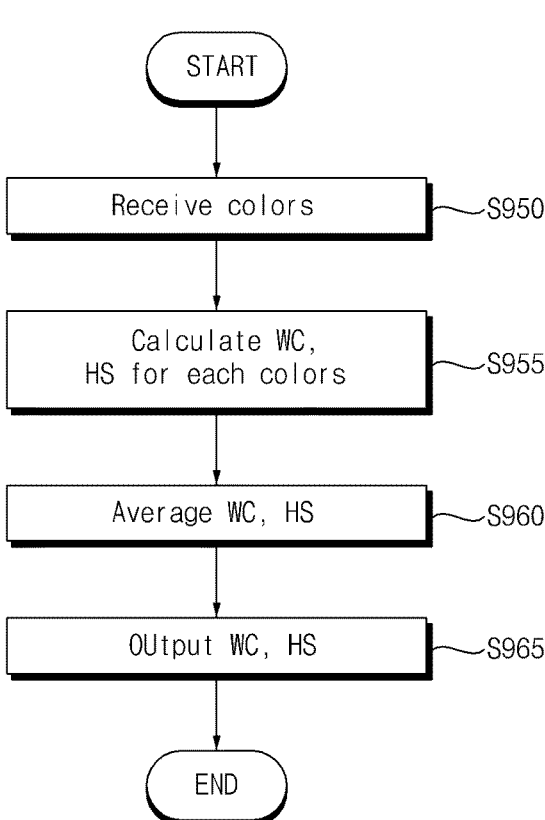

FIG. 9B is a flowchart illustrating operation of the color scale calculator of FIG. 8A.

Referring to the drawing, the color scale calculator 674 receives color information per pixel of an input image frame (S950).

Then, the color scale calculator 674 calculates two-dimensional color scale information based on the received color information (S955). In this case, in the two-dimensional color scale information, the x-axis represents warm and cool colors, and the y-axis represents soft and hard colors.

Subsequently, the color scale calculator 674 calculates an average value based on the two-dimensional color scale information (S960).

Further, the color scale calculator 674 outputs an average value of the two-dimensional color scale information (S965). Accordingly, the average value of the two-dimensional color scale information may be stably output.

Figure 10A:
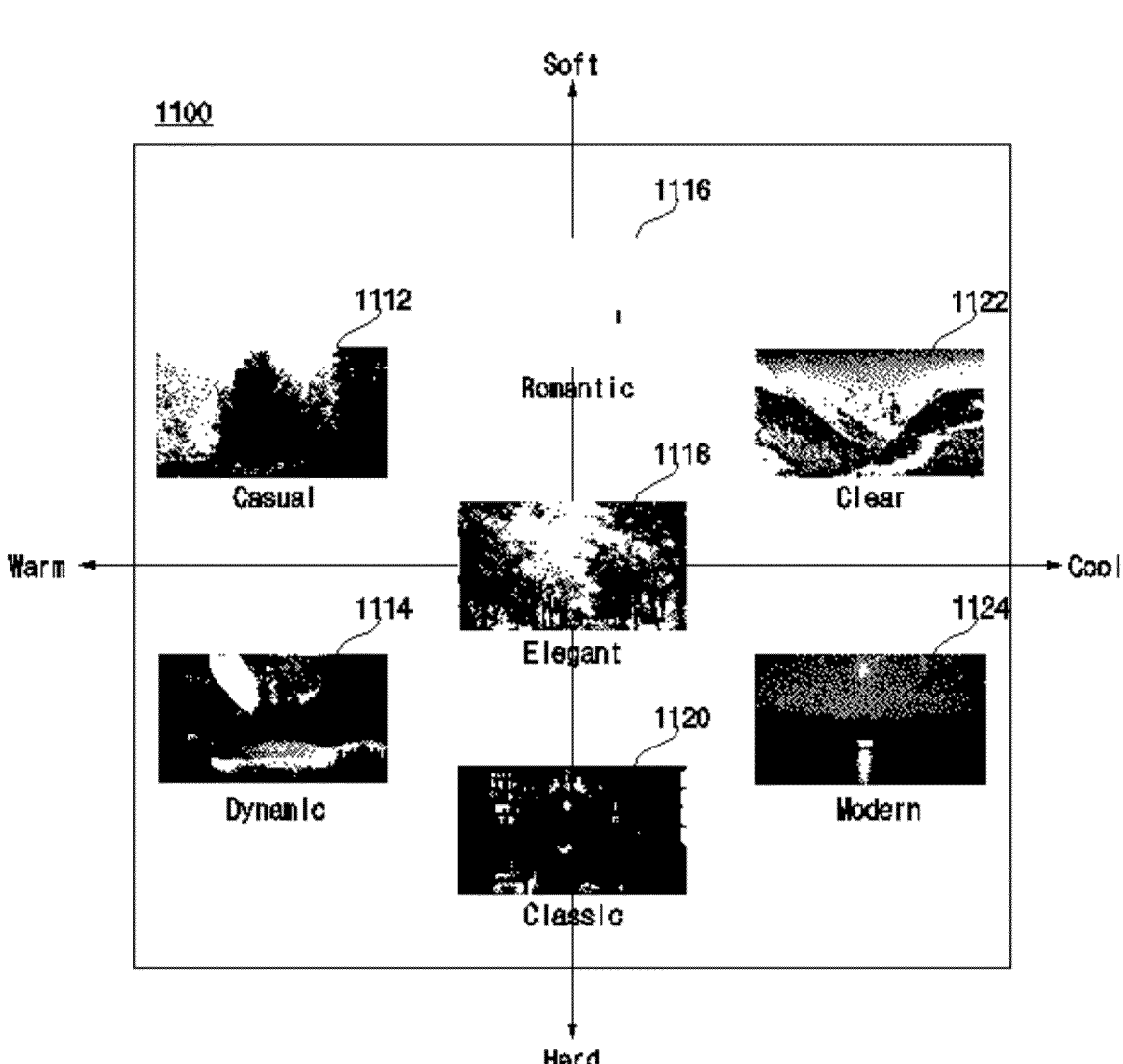

FIG. 10A is a diagram illustrating an example of two-dimensional color scale information.

Referring to the drawing, the signal processing device 170 may divide emotion-based color scale information into a first region (Casual), a second region (Dynamic), a third region (Romantic), a fourth region (Elegant), a fifth region (Classic), a sixth region (Clear), and a seventh region (Modern), on a two-dimensional basis.

In the two-dimensional color scale information, the x-axis represents warm and cool colors, and the y-axis represents soft and hard colors.

Meanwhile, as coordinate information in the emotion-based color scale information moves in a first direction (e.g., left direction) on a first axis (e.g., x-axis), the signal processing device 170 adjusts white balance for increasing a red region of the image frame, and as coordinate information in the emotion-based color scale information moves in a second direction (e.g., right direction) which is opposite to the first direction on the first axis (e.g., x-axis), the signal processing device 170 adjusts white balance for increasing a blue region of the image frame. Accordingly, the image frame may be displayed with an emotion-based image quality.

Meanwhile, as coordinate information in the emotion-based color scale information moves in a third direction (e.g., upward direction) on a second axis (e.g., y-axis), the signal processing device 170 decreases a contrast level of the image frame, and as coordinate information in the emotion-based color scale information moves in a fourth direction (e.g., downward direction) which is opposite to the third direction on the second axis (e.g., y-axis), the signal processing device 170 increases the contrast level of the image frame. Accordingly, the image frame may be displayed with an emotion-based image quality.

Meanwhile, the signal processing device 170 may control white balance of the third to fifth regions to be higher than that of the first and second regions, and may control white balance of the sixth and seventh regions to be higher than that of the third to fifth regions.

Meanwhile, the signal processing device 170 may control contrast of the second region to increase more than that of the first region, may control contrast of the third to fifth regions to increase in order of the third region, the fourth region, and the fifth region, and may control contrast of the seventh region to increase more than that of the sixth region. Accordingly, the image frame may be displayed with an emotion-based image quality.

FIG. 10B is a diagram illustrating emotions corresponding to the seven regions of FIG. 10A, and white balance and contrast settings corresponding to the emotions.

Referring to the drawing, the signal processing device 170 may set white balance to warm for the first region (Casual), the second region (Dynamic), the fifth region (Classic), etc., and may set white balance to cool for the sixth region (Clear), the seventh region (Modern), and the like.

Meanwhile, the signal processing device 170 may set contrast to soft for the first region (Casual) and the third region (Romantic), and may set contrast to hard for the fifth region (Classic) and the seventh region (Modern).

Figure 11A:
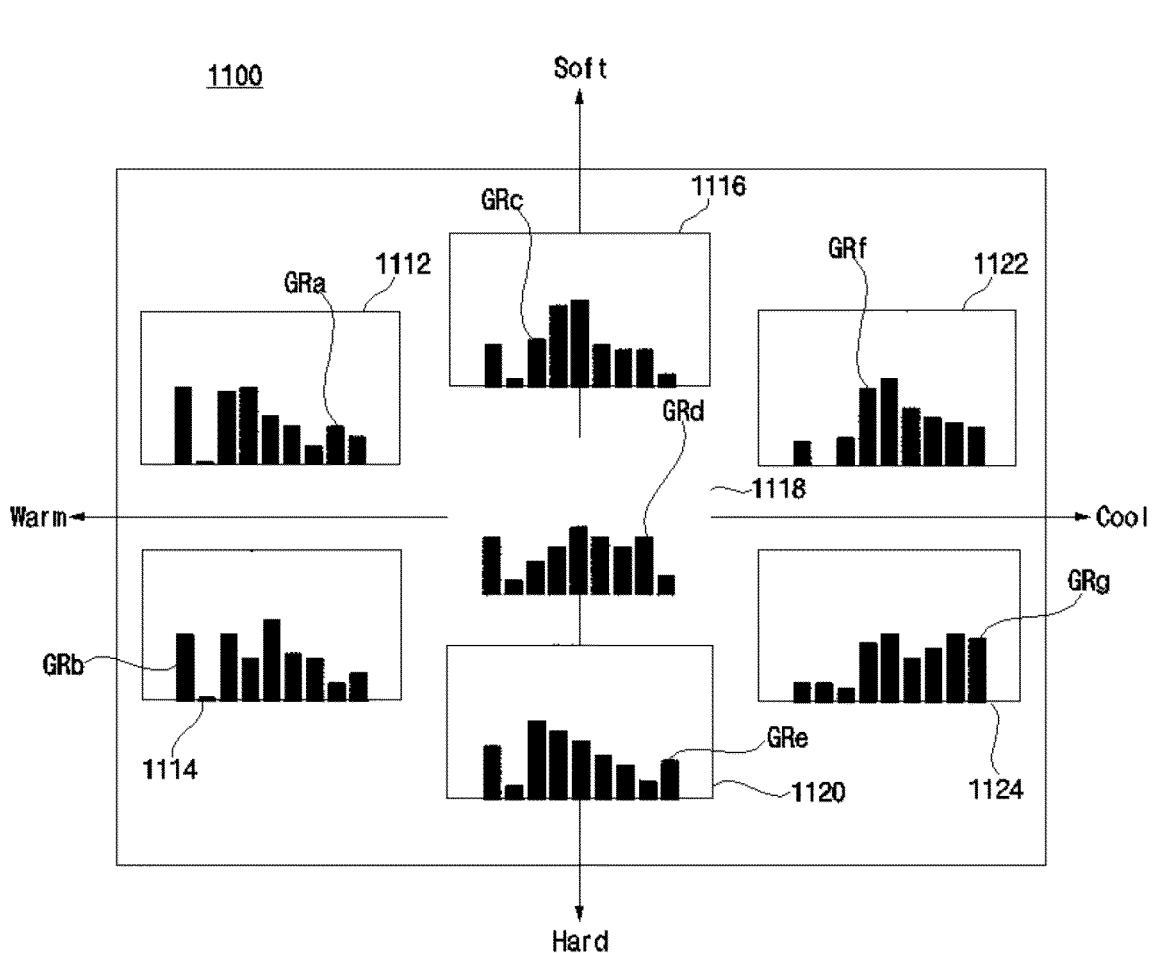

FIG. 11A is a diagram illustrating white balance graphs corresponding to the seven regions of FIG. 10A.

Referring to the drawing, the signal processing device 170 may select any one of seven regions 1112, 1114, 1116, 1118, 1120, 1122, and 1124 based on coordinate information in the emotion-based color scale information, and may adjust contrast based on white balance graphs GRa to GRg corresponding to the selected region. Accordingly, the image frame may be displayed with an emotion-based image quality.

For example, upon selecting the first region 1112 among the seven regions, the signal processing device 170 may set white balance to warm for the selected region.

Figure 11B:
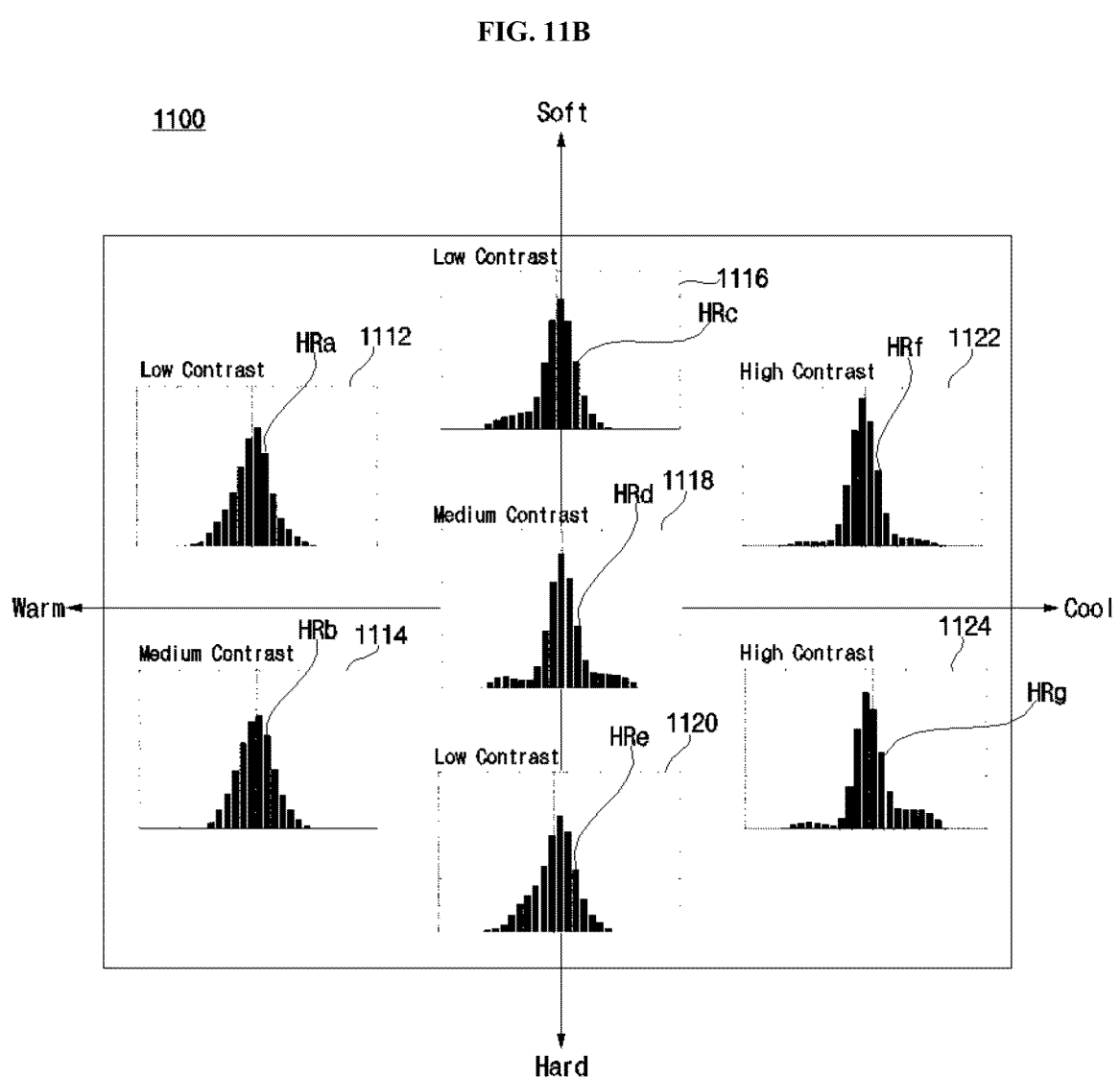

FIG. 11B is a diagram illustrating contrast graphs corresponding to the seven regions of FIG. 10A.

Referring to the drawing, the signal processing device 170 may select any one of the seven regions 1112, 1114, 1116, 1118, 1120, 1122, and 1124 based on coordinate information in the emotion-based color scale information, and may adjust contrast based on contrast graphs HRa to HRg corresponding to the selected region. Accordingly, the image frame may be displayed with an emotion-based image quality.

For example, upon selecting the seventh region 1124 among the seven regions, the signal processing device 170 may set contrast to hard for the selected region.

Figure 12A:
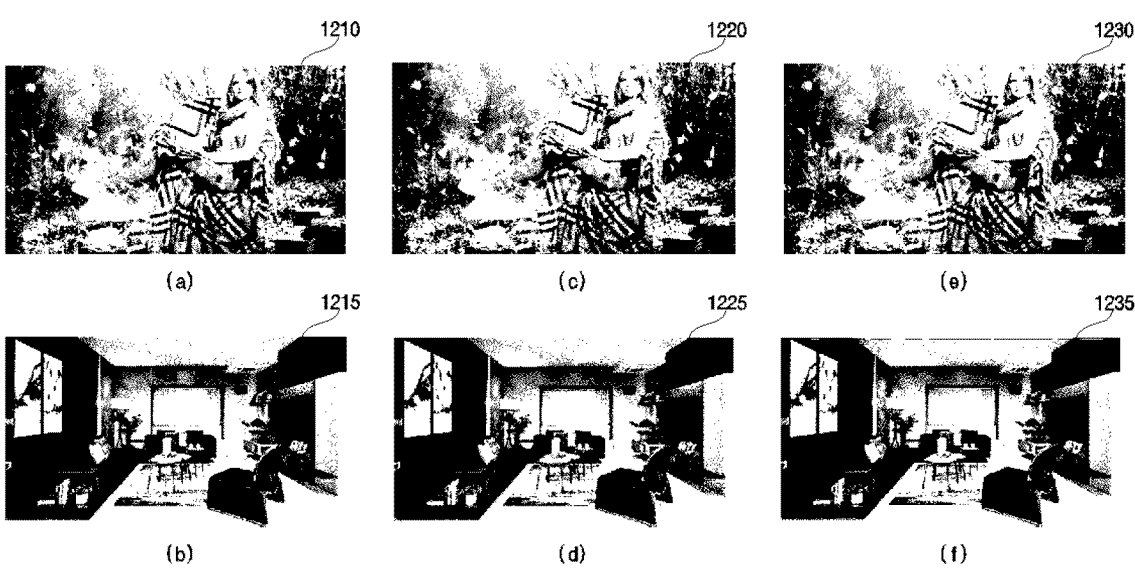

FIG. 12A is a diagram illustrating an example of adjusting white balance.

Referring to the drawing, a first image 1210 and a second image 1215 are each input images, and a third image 1220 and a fourth image 1225 are images to which the same white balance is applied, despite different background colors.

Meanwhile, a fifth image 1230 and a sixth image 1235 are images in which according to an embodiment of the present disclosure, the signal processing device 170 extracts emotion-based color scale information from image frames and adjusts white balance for the image frames based on the extracted information.

As the fifth image 1230 has a red-based background color, the signal processing device 170 according to an embodiment of the present disclosure matches the fifth image 1230 to the first region 1112 among the seven regions of FIG. 10A and sets white balance to warm.

As the sixth image 1235 has a blue-based background color, the signal processing device 170 according to an embodiment of the present disclosure matches the sixth image 1235 to the sixth region 1122 among the seven regions of FIG. 10A and sets white balance to cool.

As described above, by varying the white balance settings according to the background colors of image frames, the image frames may be displayed with an emotion-based image quality.

Figure 12B:
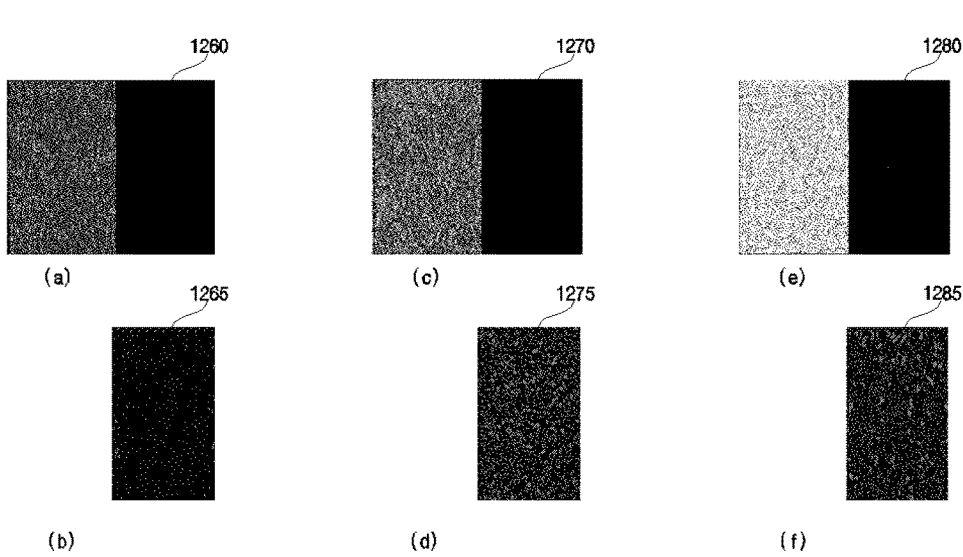

FIG. 12B is a diagram illustrating another example of adjusting white balance.

Referring to the drawing, a first image 1260 and a second image 1265 are each input images, and a third image 1270 and a fourth image 1275 are images to which the same white balance is applied, despite different background colors.

Meanwhile, a fifth image 1280 and a sixth image 1285 are images in which according to an embodiment of the present disclosure, the signal processing device 170 extracts emotion-based color scale information from image frames and adjusts white balance for the image frames based on the extracted information.

As the fifth image 1280 has a red-based background color, the signal processing device 170 according to an embodiment of the present disclosure matches the fifth image 1280 to the first region 1112 among the seven regions of FIG. 10A and sets white balance to warm.

As the sixth image 1285 has a blue-based background color, the signal processing device 170 according to an embodiment of the present disclosure matches the sixth image 1285 to the sixth region 1127 among the seven regions of FIG. 10A and sets white balance to cool.

As described above, by varying the white balance settings according to the background colors of image frames, the image frames may be displayed with an emotion-based image quality.

Figure 12C:
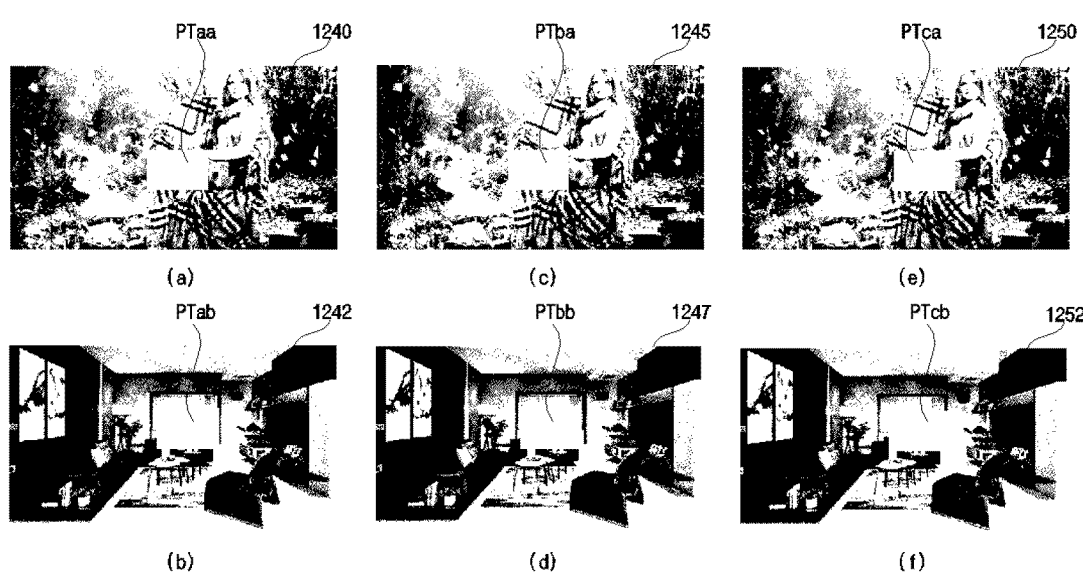

Meanwhile, upon setting a first pattern in a first image frame as first color coordinates and receiving the first image frame having the first pattern, the signal processing device 170 may set the first pattern as the first color coordinates, and in response to receiving a second image frame having a second pattern identical to the first pattern, the signal processing device 170 may set the second pattern as second color coordinates different from the first color coordinates, which will be described below with reference to FIG. 12C.

FIG. 12C is a diagram illustrating further another example of adjusting white balance.

Referring to the drawing, a first image 1240 and a second image 1242 are input images having a first pattern PTaa and a second pattern PTab, respectively, and a third image 1245 and a fourth image 1247 are images which have a third pattern PTba and a fourth pattern PTbb, respectively, and to which the same white balance is applied, despite different background colors.

In the case where the same white balance is applied to the first pattern PTaa and the second pattern PTab which are the same white pattern, the third pattern PTba in the third image 1245 and the fourth pattern PTbb in the fourth image 1247 are displayed in almost the same light yellow color.

Meanwhile, a fifth image 1250 and a sixth image 1252 having a fifth pattern PTca and a sixth pattern PTcb, respectively, are images in which according to an embodiment of the present disclosure, the signal processing device 170 extracts emotion-based color scale information from image frames and adjusts white balance for the image frames based on the extracted information.

As the fifth image 1250 has a red-based background color, the signal processing device 170 according to an embodiment of the present disclosure matches the fifth image 1250 to the first region 1112 among the seven regions of FIG. 10A and sets white balance to warm.

As the sixth image 1252 has a blue-based background color, the signal processing device 170 according to an embodiment of the present disclosure matches the sixth image 1252 to the sixth region 1127 among the seven regions of FIG. 10A and sets white balance to cool.

Accordingly, the fifth pattern PTca in the fifth image 1250 is displayed in light yellow, but unlike the fifth pattern PTca, the sixth pattern PTcb in the sixth image 1252 is displayed in light blue.

That is, in the case where image frames have different background colors with the same internal pattern, the signal processing device 170 according to an embodiment of the present disclosure adaptively adjusts white balance so that the internal pattern may be displayed in different colors. Accordingly, the image frames may be displayed with an emotion-based image quality.

Figure 13:
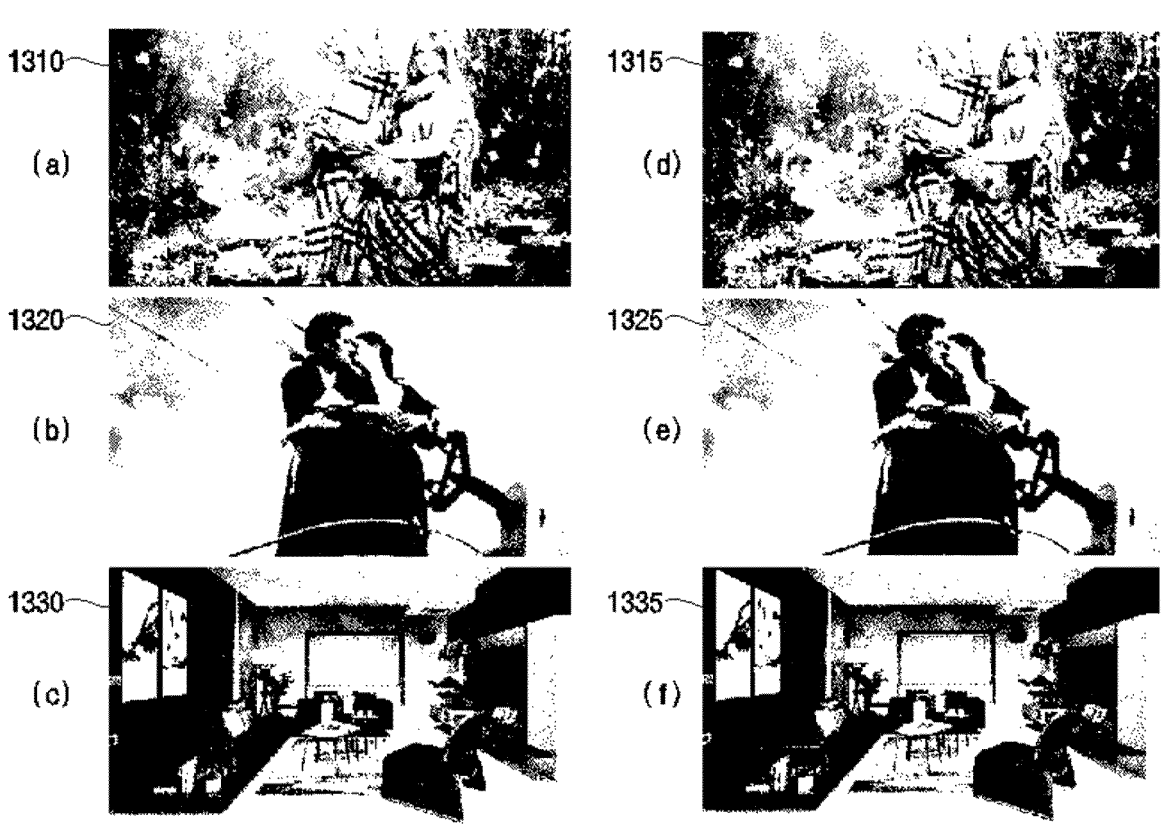

FIG. 13 is a diagram illustrating further another example of adjusting white balance.

Referring to the drawing, a first image 1310, a second image 1320, and a third image 1330, which are input images, may correspond to the first region (Casual), the third region (Romantic), and the seventh region (Modern), respectively, of FIG. 10A.

The signal processing device 170 according to an embodiment of the present disclosure may adjust white balance based on emotion-based color scale information of an image frame.

Accordingly, the signal processing device 170 may perform control so that a fourth image 1315, a fifth image 1325, and a sixth image 1335 may be displayed, which correspond to the first image 1310, the second image 1320, and the third image 1330, respectively, and for which white balance is adjusted.

Specifically, as the fourth image 1315 corresponds to the first region (Casual), the signal processing device 170 adjusts white balance so that a red region of the image frame may be highlighted, and as the sixth image 1335 corresponds to the seventh region (Modern), the signal processing device 170 adjusts white balance so that a blue region of the image frame may be highlighted. Accordingly, the image frame may be displayed with an emotion-based image quality.

Meanwhile, as the fifth image 1325 corresponds to the third region (Romantic), the signal processing device 170 adjusts white balance corresponding to the third region (Romantic).

Figure 14:
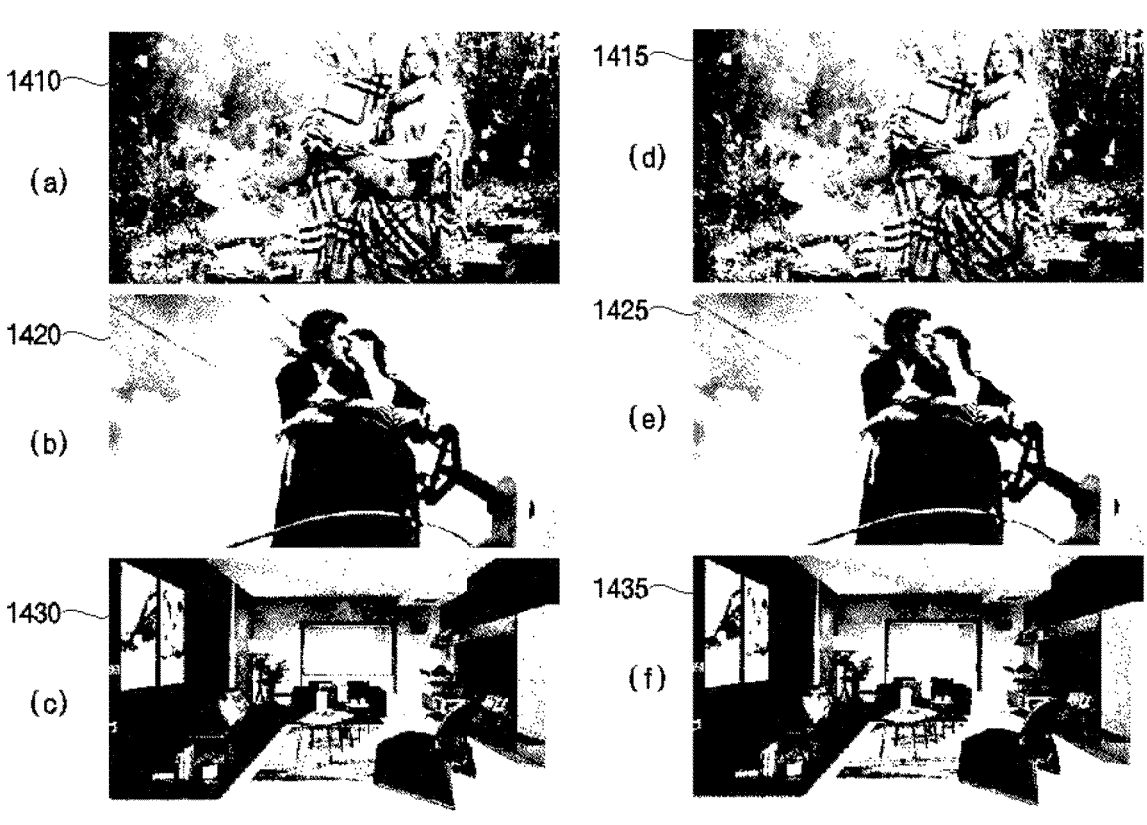

FIG. 14 is a diagram illustrating an example of adjusting contrast.

Referring to the drawing, a first image 1410, a second image 1420, and a third image 1430, which are input images, may correspond to the first region (Casual), the third region (Romantic), and the seventh region (Modern), respectively, of FIG. 10A.

The signal processing device 170 according to an embodiment of the present disclosure may adjust contrast based on emotion-based color scale information of an image frame.

Accordingly, the signal processing device 170 may perform control so that a fourth image 1415, a fifth image 1425, and a sixth image 1435 may be displayed, which correspond to the first image 1410, the second image 1420, and the third image 1430, respectively, and for which contrast is adjusted.

Specifically, as illustrated in FIG. 10B, as the fourth image 1415 corresponds to the first region (Casual), the signal processing device 170 may decrease a contrast level of the image frame, as the fifth image 1425 corresponds to the third region (Romantic), the signal processing device 170 may decrease a contrast level of the image frame, and as the sixth image 1435 corresponds to the seventh region (Modern), the signal processing device 170 may increase the contrast level of the image frame. Accordingly, the image frames may be displayed with an emotion-based image quality.

Figure 15:
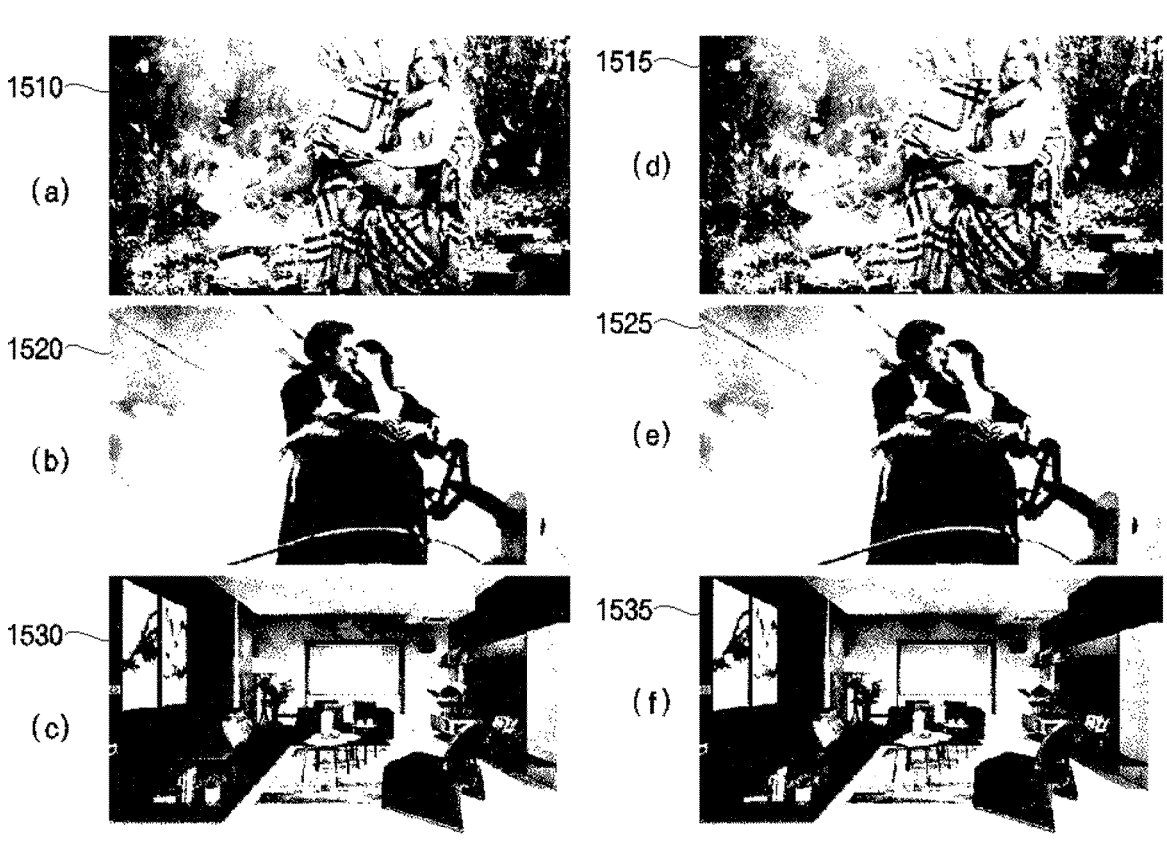

FIG. 15 is a diagram illustrating an example of adjusting white balance and contrast.

Referring to the drawing, a first image 1510, a second image 1520, and a third image 1530, which are input images, may correspond to the first region (Casual), the third region (Romantic), and the seventh region (Modern), respectively, of FIG. 10A.

The signal processing device 170 according to an embodiment of the present disclosure may adjust white balance and contrast based on emotion-based color scale information of an image frame.

Accordingly, the signal processing device 170 may perform control so that a fourth image 1515, a fifth image 1525, and a sixth image 1535 may be displayed, which correspond to the first image 1510, the second image 1520, and the third image 1530, respectively, and for which white balance and contrast are adjusted.

Specifically, as the fourth image 1515 corresponds to the first region (Casual), the signal processing device 170 may adjust white balance so that a red region of the image frame may be highlighted and may decrease a contrast level of the image frame.

Meanwhile, as the fifth image 1525 corresponds to the third region (Romantic), the signal processing device 170 may adjust white balance corresponding to the third region (Romantic) and may decrease a contrast level of the image frame.

Meanwhile, as the sixth image 1535 corresponds to the seventh region (Modern), the signal processing device 170 may adjust white balance so that a blue region of the image frame may be highlighted and may increase the contrast level of the image frame. Accordingly, the image frame may be displayed with an emotion-based image quality.

The image display apparatus 100 according to an embodiment of the present disclosure may further include a user input interface 150 configured to receive a command signal from the remote controller 200, wherein the signal processing device 170 may adjust white balance of the image frame based on a white balance setting value set on a white balance setting screen and the extracted information, which will be described below with reference to FIG. 16.

Figure 16:
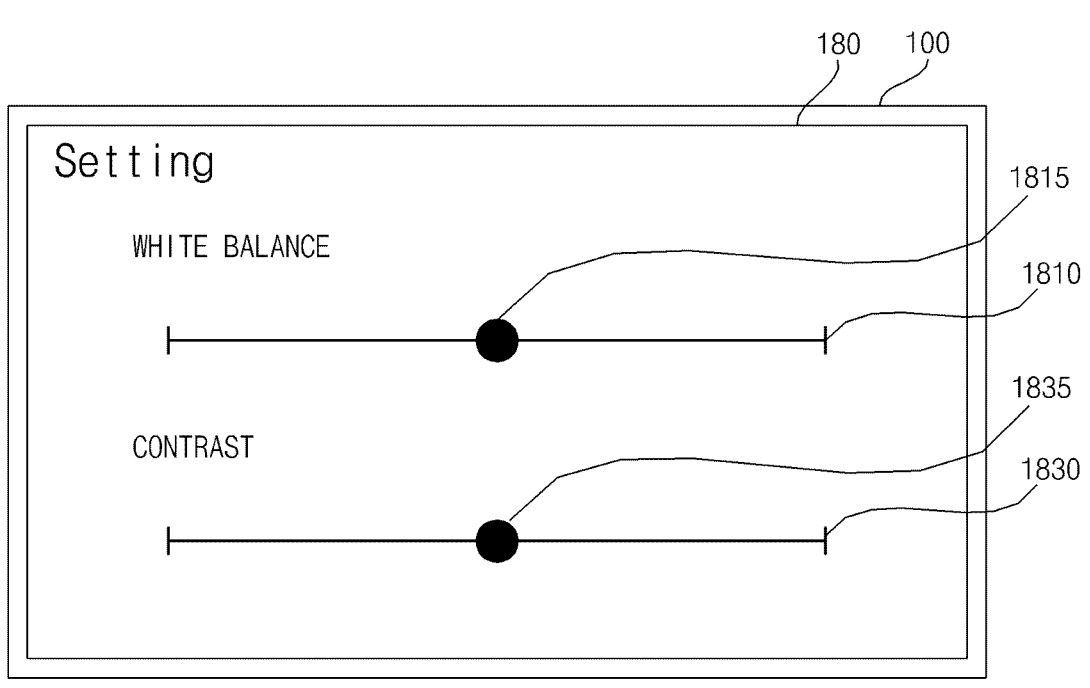

FIG. 16 is a diagram illustrating an example of a setting screen displayed on an image display apparatus.

Referring to the drawing, the user input interface 150 of the image display apparatus 100 receives a command signal from the remote controller 200, and the signal processing apparatus 170 may perform control so that an image quality setting screen may be displayed as illustrated herein.

As illustrated in the drawing, the signal processing device 170 may perform control so that a white balance adjustment region 1810 and a contrast adjustment region 1830 may be displayed in the image quality setting screen.

In response to a movement signal from the remote controller 200, a first control bar 1815 in the white balance adjustment region 1810 may move, such that the signal processing device 170 may adjust white balance of an image frame based on a set white balance value and emotion-based color scale information of the image frame. Accordingly, the image quality may be adjusted based on user settings and the image frame.

Meanwhile, in response to a movement signal from the remote controller 200, a second control bar 1835 in the contrast adjustment region 1835 may move, such that the signal processing device 170 may adjust contrast of an image frame based on a set contrast value and emotion-based color scale information of the image frame. Accordingly, the image quality may be adjusted based on user settings and the image frame.

As is apparent from the above description, an image display apparatus according to an embodiment of the present disclosure includes: a display; an interface configured to exchange data with an external server or an external electronic device; and a signal processing device configured to extract emotion-based color scale information from an image frame of an input image, and to adjust white balance of the image frame based on the extracted information. Accordingly, the image frame may be displayed with an emotion-based image quality. Particularly, emotion of content may be extracted based on a background color of the image frame, and image quality processing may be performed based on the extracted emotion. As a result, it is possible to increase the sense of immersion in content based on the background color of the image frame.

Meanwhile, the signal processing device may be configured to: in response to emotion-based color scale information of an input image in a first image frame being first information, adjust white balance of the first image frame to a first ratio; and in response to emotion-based color scale information of an input image in a second image frame being second information, adjust white balance of the second image frame to a second ratio. Accordingly, the image frame may be displayed with an emotion-based image quality.

Meanwhile, based on the extracted information, the signal processing device may further adjust contrast or color of the image frame. Accordingly, the image frame may be displayed with an emotion-based image quality. As a result, it is possible to increase the sense of immersion in content based on the background color of the image frame.

Meanwhile, the signal processing device may be configured to: in response to the emotion-based color scale information of the input image in the first image frame being the first information, adjust contrast of the first image frame to a first level; and in response to the emotion-based color scale information of the input image in the second image frame being the second information, adjust contrast of the second image frame to a second level. Accordingly, the image frame may be displayed with an emotion-based image quality.

Meanwhile, the signal processing device may be configured to: in response to the emotion-based color scale information of the input image in the first image frame being the first information, adjust color of the first image frame to a first color; and in response to the emotion-based color scale information of the input image in the second image frame being the second information, adjust color of the second image frame to a second color. Accordingly, the image frame may be displayed with an emotion-based image quality.

Meanwhile, the signal processing device may receive, from the server or the electronic device, parameter data for extracting the emotion-based color scale information and may extract the emotion-based color scale information by performing processing based on the parameter data. Accordingly, the image frame may be displayed with an emotion-based image quality.

Meanwhile, the signal processing device may generate, by learning, parameter data for extracting the emotion-based color scale information, and may extract the emotion-based color scale information by performing processing based on the parameter data. Accordingly, the image frame may be displayed with an emotion-based image quality.

Meanwhile, the signal processing device may extract coordinate information in the emotion-based color scale information from the image frame and may adjust the white balance of the image frame based on the extracted coordinate information. Accordingly, the image frame may be displayed with an emotion-based image quality.

Meanwhile, the signal processing device may extract coordinate information, corresponding to a dominant color of the image frame, in the emotion-based color scale information. Accordingly, the image frame may be displayed with an emotion-based image quality.

Meanwhile, the signal processing device may be configured to: as the coordinate information in the emotion-based color scale information moves in a first direction on a first axis, adjust white balance for increasing a red region of the image frame; and as the coordinate information in the emotion-based color scale information moves in a second direction which is opposite to the first direction on the first axis, adjust white balance for increasing a blue region of the image frame. Accordingly, the image frame may be displayed with an emotion-based image quality.

Meanwhile, the signal processing device may be configured to: as the coordinate information in the emotion-based color scale information moves in a third direction on a second axis, decrease a contrast level of the image frame; and as the coordinate information in the emotion-based color scale information moves in a fourth direction which is opposite to the third direction on the second axis, increase the contrast level of the image frame. Accordingly, the image frame may be displayed with an emotion-based image quality.

Meanwhile, the signal processing device may divide the emotion-based color scale information into a first region (Casual), a second region (Dynamic), a third region (Romantic), a fourth region (Elegant), a fifth region (Classic), a sixth region (Clear), and a seventh region (Modern) on a two-dimensional basis. Accordingly, the image frame may be displayed with an emotion-based image quality.

Meanwhile, the signal processing device may control white balance of the third to fifth regions to be higher than that of the first and second regions, and may control white balance of the sixth and seventh regions to be higher than that of the third to fifth regions. Accordingly, the image frame may be displayed with an emotion-based image quality.

Meanwhile, the signal processing device may control contrast of the second region to increase more than that of the first region, may control contrast of the third to fifth regions to increase in order of the third region, the fourth region, and the fifth region, and may control contrast of the seventh region to increase more than that of the sixth region. Accordingly, the image frame may be displayed with an emotion-based image quality.

Meanwhile, the signal processing device may set a first pattern in the first image frame as first color coordinates, wherein in response to receiving the first image frame having the first pattern, the signal processing device may set the first pattern as the first color coordinates, and in response to receiving a second image frame having a second pattern identical to the first pattern, the signal processing device may set the second pattern as second color coordinates different from the first color coordinates. Accordingly, the image frame may be displayed with an emotion-based image quality.

Meanwhile, the display may include: a panel; and a timing controller configured to output a data driving signal and a gate driving signal based on an image signal from the signal processing device, wherein the timing controller may output the data driving signal and the gate driving signal based on an image signal for which the white balance of the image frame is adjusted. Accordingly, the image frame may be displayed with an emotion-based image quality.

The image display apparatus according to an embodiment of the present disclosure may further include an input interface configured to receive a command signal from a remote controller, wherein the signal processing device may adjust the white balance of the image frame based on a white balance setting value set on a white balance setting screen, and the extracted information. Accordingly, the image frame may be displayed with an emotion-based image quality.

An image display apparatus according to another embodiment of the present disclosure includes: a display; an interface configured to exchange data with an external server or an external electronic device; and a signal processing device configured to extract emotion-based color scale information from an image frame of an input image, and to adjust contrast of the image frame based on the extracted information. Accordingly, the image frame may be displayed with an emotion-based image quality. Particularly, emotion of content may be extracted based on a background color of the image frame, and image quality processing may be performed based on the extracted emotion. As a result, it is possible to increase the sense of immersion in content based on the background color of the image frame.

An image display apparatus according to further another embodiment of the present disclosure includes: a display; an interface configured to exchange data with an external server or an external electronic device; and a signal processing device configured to, in response to receiving a first image frame having a first pattern, set the first pattern as first color coordinates, and in response to receiving a second image frame having a second pattern identical to the first pattern, set the second pattern as second color coordinates different from the first color coordinates. Accordingly, the image frame may be displayed with an emotion-based image quality. Particularly, emotion of content may be extracted based on a background color of the image frame, and image quality processing may be performed based on the extracted emotion. As a result, it is possible to increase the sense of immersion in content based on the background color of the image frame.

Meanwhile, the signal processing device may extract emotion-based color scale information from an image frame of an input image and may adjust white balance of the image frame based on the extracted information. Accordingly, the image frame may be displayed with an emotion-based image quality.

Meanwhile, the signal processing device may adjust contrast of the image frame based on the extracted information. Accordingly, the image frame may be displayed with an emotion-based image quality.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. An image display apparatus comprising:
a display;
an interface configured to exchange data with an external server or an external electronic device; and
a signal processing device configured to extract color scale information based on an emotion from an image frame of an input image, and to adjust a white balance of the image frame based on the extracted color scale information based on the emotion,
wherein the emotion corresponds to an emotion of content based on the image frame,
wherein the signal processing device is configured to extract a background color of the image frame,
wherein the color scale information based on emotion is extracted by performing processing based on the background color and parameter data for the color scale information, and
wherein the signal processing device is further configured to:
in response to the color scale information based on the emotion of an input image in the image frame being first information, adjust the white balance of the image frame to a first ratio; and
in response to the color scale information based on the emotion of an input image in the image frame being second information, adjust the white balance of the image frame to a second ratio different from the first ratio.

2. The image display apparatus of claim 1, wherein based on the extracted color scale information based on the emotion, the signal processing device further adjusts a contrast or a color of the image frame.

3. The image display apparatus of claim 2, wherein the signal processing device is configured to:
in response to the color scale information based on the emotion of the input image in the image frame being the first information, adjust the contrast of the image frame to a first level; and
in response to the color scale information based on the emotion of the input image in the image frame being the second information, adjust the contrast of the image frame to a second level different from the first level.

4. The image display apparatus of claim 2, wherein the signal processing device is configured to:
in response to the color scale information based on the emotion of the input image in the image frame being the first information, adjust the color of the image frame to a first color; and
in response to the color scale information based on the emotion of the input image in the image frame being the second information, adjust the color of the image frame to a second color different from the first color.

5. The image display apparatus of claim 1, wherein the signal processing device receives, from the external server or the external electronic device, parameter data for extracting the color scale information based on the emotion.

6. The image display apparatus of claim 1, wherein the signal processing device extracts coordinate information in the color scale information based on the emotion from the image frame and adjusts the white balance of the image frame based on the extracted coordinate information.

7. The image display apparatus of claim 1, wherein the signal processing device extracts coordinate information, corresponding to a dominant color of the image frame, in the color scale information based on the emotion.

8. The image display apparatus of claim 6, wherein the signal processing device is configured to:
as the extracted coordinate information in the color scale information based on the emotion moves in a first direction on a first axis, adjust the white balance for increasing a red region of the image frame; and
as the extracted coordinate information in the color scale information based on the emotion moves in a second direction which is opposite to the first direction on the first axis, adjust the white balance for increasing a blue region of the image frame.

9. The image display apparatus of claim 6, wherein the signal processing device is configured to:
as the extracted coordinate information in the color scale information based on the emotion moves in a third direction on a second axis, decrease a contrast level of the image frame; and
as the extracted coordinate information in the color scale information based on the emotion moves in a fourth direction which is opposite to the third direction on the second axis, increase the contrast level of the image frame.

10. The image display apparatus of claim 1, wherein the signal processing device divides the color scale information based on the emotion into a first region (Casual), a second region (Dynamic), a third region (Romantic), a fourth region (Elegant), a fifth region (Classic), a sixth region (Clear), and a seventh region (Modern) on a two-dimensional basis, wherein the signal processing device controls white balance of the third to fifth regions to be higher than that of the first and second regions, and controls white balance of the sixth and seventh regions to be higher than that of the third to fifth regions.

11. The image display apparatus of claim 10, wherein the signal processing device controls contrast of the second region to increase more than that of the first region, controls contrast of the third to fifth regions to increase in order of the third region, the fourth region, and the fifth region, and controls contrast of the seventh region to increase more than that of the sixth region.

12. The image display apparatus of claim 1, wherein the signal processing device sets a first pattern in the image frame as first color coordinates, wherein in response to receiving the image frame having the first pattern, the signal processing device sets the first pattern as the first color coordinates, and wherein in response to receiving a subsequent image frame having a second pattern identical to the first pattern, the signal processing device sets the second pattern as second color coordinates different from the first color coordinates.

13. The image display apparatus of claim 1, wherein the display comprises:

a panel; and a timing controller configured to output a data driving signal and a gate driving signal based on an image signal from the signal processing device, wherein the timing controller outputs the data driving signal and the gate driving signal based on an image signal for which the white balance of the image frame is adjusted.

14. The image display apparatus of claim 1, further comprising an input interface configured to receive a command signal from a remote controller, wherein the signal processing device adjusts the white balance of the image frame based on a white balance setting value set on a white balance setting screen, and the extracted color scale information based on the emotion.

15. An image display apparatus comprising:

a display;

an interface configured to exchange data with an external server or an external electronic device; and a signal processing device configured to extract color scale information based on an emotion from an image frame of an input image, and to adjust a contrast of the image frame based on the extracted color scale information based on the emotion, wherein the emotion corresponds to an emotion of content based on the image frame, wherein the signal processing device is configured to extract a background color of the image frame, wherein the color scale information based on emotion is extracted by performing processing based on the background color and parameter data for the color scale information, wherein the signal processing device is further configured to:

decrease a contrast level of the image frame as coordinate information in the color scale information based on emotion moves in a first direction on a first axis; and increase the contrast level of the image frame as the coordinate information in the color scale information based on emotion moves in a second direction which is opposite to the first direction on the first axis.

16. An image display apparatus comprising:

a display;

an interface configured to exchange data with an external server or an external electronic device; and a signal processing device configured to, in response to receiving a first image frame having a first pattern, set the first pattern as first color coordinates, and in response to receiving a second image frame having a second pattern identical to the first pattern, set the second pattern as second color coordinates different from the first color coordinates.

17. The image display apparatus of claim 16, wherein the signal processing device extracts color scale information based on an emotion from an image frame of an input image and adjusts a white balance of the image frame based on the extracted color scale information based on the emotion, wherein the emotion corresponds to emotion of content based on the image frame, wherein the signal processing device is configured to extract a background color of the image frame, and wherein the color scale information based on emotion is extracted by performing processing based on the background color and parameter data for the color scale information.

18. The image display apparatus of claim 17, wherein the signal processing device adjusts a contrast of one of the first and second image frame based on the extracted color scale information based on the emotion.

* * * * *